(12) United States Patent
Kim et al.

(10) Patent No.: US 12,535,859 B2
(45) Date of Patent: Jan. 27, 2026

(54) DISPLAY DEVICE

(71) Applicant: Samsung Display Co., LTD., Yongin-si (KR)

(72) Inventors: Hyun Tae Kim, Yongin-si (KR); Jung Hyun Oh, Yongin-si (KR); Byung Seo Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 169 days.

(21) Appl. No.: 18/365,122

(22) Filed: Aug. 3, 2023

(65) Prior Publication Data

US 2023/0393626 A1     Dec. 7, 2023

(30) Foreign Application Priority Data

Oct. 11, 2022   (KR) .................. 10-2022-0130072
Feb. 23, 2023   (KR) .................. 10-2023-0024049

(51) Int. Cl.
  *G06F 1/16*      (2006.01)
(52) U.S. Cl.
  CPC .................................. *G06F 1/1652* (2013.01)
(58) Field of Classification Search
  CPC .... G06F 1/1652; G06F 1/1637; G06F 1/1641; H10K 2102/311; H10K 77/111
  See application file for complete search history.

(56) References Cited

U.S. PATENT DOCUMENTS

| | | | |
|---|---|---|---|
| 9,983,424 B2 * | 5/2018 | Kim ..................... | H10K 77/111 |
| 11,503,727 B2 | 11/2022 | Seo et al. | |
| 11,656,655 B2 * | 5/2023 | Shin ..................... | G06F 1/1641 |
| | | | 361/679.27 |
| 2018/0175310 A1 * | 6/2018 | Lee ........................ | B32B 27/308 |
| 2018/0192527 A1 * | 7/2018 | Yun ....................... | G06F 1/1681 |
| 2019/0204867 A1 * | 7/2019 | Song ..................... | G09G 3/3208 |
| 2019/0346887 A1 * | 11/2019 | Park ....................... | G06F 1/1652 |
| 2021/0153363 A1 * | 5/2021 | Cao ....................... | H10K 77/111 |
| 2021/0165454 A1 * | 6/2021 | Dong ..................... | G06F 1/1652 |
| 2022/0189349 A1 * | 6/2022 | Roh ....................... | G06F 1/1652 |
| 2022/0206537 A1 * | 6/2022 | Park ....................... | G06F 1/1641 |
| 2023/0018777 A1 * | 1/2023 | Park ....................... | G06F 1/1656 |

(Continued)

FOREIGN PATENT DOCUMENTS

| | | |
|---|---|---|
| CN | 111445796 A | 7/2020 |
| CN | 112786621 A | 5/2021 |
| KR | 10-2021-0011555 A | 2/2021 |

(Continued)

*Primary Examiner* — Rockshana D Chowdhury
(74) *Attorney, Agent, or Firm* — Womble Bond Dickinson (US) LLP

(57) ABSTRACT

A display device includes: a display panel having a folding area, a first non-folding area on a side of the folding area, and a second non-folding area on another side of the folding area; a support member on a surface of the display panel and having a plurality of slits in the folding area and a plurality of bars between the slits; and a base resin on the support member and inside the support member. A height of a first one of the bars at an edge of the folding area is higher than a height of a second one of the bars in a central area of the folding area, and a width of a first one of the slits at the edge of the folding area is smaller than a width of a second one of the slits in the central area of the folding area.

20 Claims, 19 Drawing Sheets

(56) References Cited

U.S. PATENT DOCUMENTS

2023/0161377 A1\* 5/2023 Lee .................. G09F 9/301
                                        361/679.01
2025/0107023 A1\* 3/2025 Wang ................. H05K 5/0217

FOREIGN PATENT DOCUMENTS

| KR | 10-2021-0091388 A | 7/2021 |
| KR | 10-2022-0009260 A | 1/2022 |

\* cited by examiner

DISPLAY DEVICE

CROSS-REFERENCE TO RELATED APPLICATION

This application claims the priority to and the benefit of Korean Patent Application No. 10-2022-0130072, filed on Oct. 11, 2022, and Korean Patent Application No. 10-2023-0024049, filed on Feb. 23, 2023, in the Korean Intellectual Property Office, the entire disclosure of each of which is incorporated herein by reference.

BACKGROUND

1. Field

Aspects of embodiments of the present disclosure relate to a display device.

2. Description of the Related Art

As the information society develops, demands for display devices for displaying images in various forms are increasing. For example, display devices are applied to (or included in) various electronic devices, such as smartphones, digital cameras, notebook computers, navigation devices, and smart televisions.

A bendable display device in which a display area can be bent and a foldable display device in which a display area can be folded, which provide increased portability while providing a wide display screen, have been recently released.

Meanwhile, technologies using fiber reinforced plastics (FRP) or metal plate as a panel support member to support a flexible display of a display device are being actively researched and developed.

SUMMARY

Embodiments of the present disclosure provide a display device in which an upper surface of a base resin is flat.

Embodiments of the present disclosure also provide a display device in which stress applied to a panel support member is reduced or minimized.

However, aspects and features of the present disclosure are not limited to those set forth herein. The above and other aspects and features of the present disclosure will become more apparent to one of ordinary skill in the art to which the present disclosure pertains by referencing the detailed description of the present disclosure given below.

According to an embodiment of the present disclosure, a display device includes: a display panel having a folding area, a first non-folding area on a side of the folding area, and a second non-folding area on another side of the folding area; a support member on a surface of the display panel and having a plurality of slits in the folding area and a plurality of bars between the slits; and a base resin on the support member and inside the support member. A height of a first one of the bars at an edge of the folding area from among the bars is higher than a height of a second one of the bars in a central area of the folding area from among the bars, and a width of a first one of the slits at the edge of the folding area from among the slits is smaller than a width of a second one of the slits in the central area of the folding area from among the slits.

Heights of the bars may decrease from the edge of the folding area toward the central area of the folding area, and widths of the slits may increase from the edge of the folding area toward the central area of the folding area.

A width of the first one of the bars at the edge of the folding area may be smaller than a width of the second one of the bars in the central area of the folding area.

Widths of the bars may increase from the edge of the folding area toward the central area of the folding area.

The support member may include: a first layer including a first fiber yarn extending in a second direction crossing a first direction; a second layer including a second fiber yarn extending in the first direction; and a third layer including a third fiber yarn extending in the second direction. The first one of the bars at the edge of the folding area may include all of the first layer, the second layer, and the third layer, and the second one of the bars in the central area of the folding area may not include at least one of the first layer, the second layer, and the third layer.

A number of types of layers in the first one of the bars at the edge of the folding area from among the first layer, the second layer, and the third layer may be greater than a number of types of layers in the second one of the bars in the central area of the folding area from among the first layer, the second layer, and the third layer.

The support member may be a metal plate including a metal material.

An upper surface of the base resin may be flat.

The width of each of the slits may be smaller than the width of each of the bars.

The support member may have a first flat portion and a second flat portion in the first non-folding area and the second non-folding area, respectively, and the height of each of the bars may be smaller than a height of the first flat portion and a height of the second flat portion.

According to another embodiment of the present disclosure, a display device includes: a display panel having a folding area, a first non-folding area on a side of the folding area, and a second non-folding area on another side of the folding area; a support member on a surface of the display panel and having a plurality of slits in the folding area and a plurality of bars between the slits; and a base resin on the support member and inside the support member. A height of a first one of the bars at an edge of the folding area from among the bars is lower than a height of a second one of the bars in a central area of the folding area from among the bars, and a width of a first one of the slits at the edge of the folding area from among the slits is greater than a width of a second one of the slits in the central area of the folding area from among the slits.

Heights of the bars may increase from the edge of the folding area toward the central area of the folding area, and widths of the slits may decrease from the edge of the folding area toward the central area of the folding area.

A width of the first one of the bars at the edge of the folding area may be greater than a width of the second of the bars in the central area of the folding area.

Widths of the bars may decrease from the edge of the folding area toward the central area of the folding area.

The support member may include: a first layer including a first fiber yarn extending in a second direction crossing a first direction; a second layer including a second fiber yarn extending in the first direction; and a third layer including a third fiber yarn extending in the second direction. The second one of the bars in the central area of the folding area may include all of the first layer, the second layer, and the third layer, and the first one of the bars at the edge of the folding area may not include at least one of the first layer, the second layer, and the third layer.

A number of types of layers in the second one of the bars in the central area of the folding area from among the first layer, the second layer, and the third layer may be greater than a number of types of layers in the first one of the bars at the edge of the folding area from among the first layer, the second layer, and the third layer.

The width of each of the slits may be smaller than the width of each of the bars.

The support member may have a first flat portion and a second flat portion in the first non-folding area and the second non-folding area, respectively, and the height of each of the bars may be smaller than a height of the first flat portion and a height of the second flat portion.

According to another embodiment of the present disclosure, a display device includes: a display panel having a folding area, a first non-folding area on a side of the folding area, and a second non-folding area on another side of the folding area; a support member on a surface of the display panel and having a plurality of slits in the folding area and a plurality of bars between the slits; and a base resin on the support member and inside the support member. A height of a first one of the bars at an edge of the folding area from among the bars is equal to a height of a second one of the bars in a central area of the folding area from among the bars, and a width of a first one of the slits at the edge of the folding area from among the slits is greater than a width of a second one of the slits in the central area of the folding area from among the slits.

The bars may have the same height, and widths of the slits may decrease from the edge of the folding area toward the central area of the folding area.

BRIEF DESCRIPTION OF THE DRAWINGS

These and/or other aspects and features of the present disclosure will become apparent and more readily appreciated from the following description of embodiments of the present disclosure, taken in conjunction with the accompanying drawings, in which.

DETAILED DESCRIPTION

Figure 1:
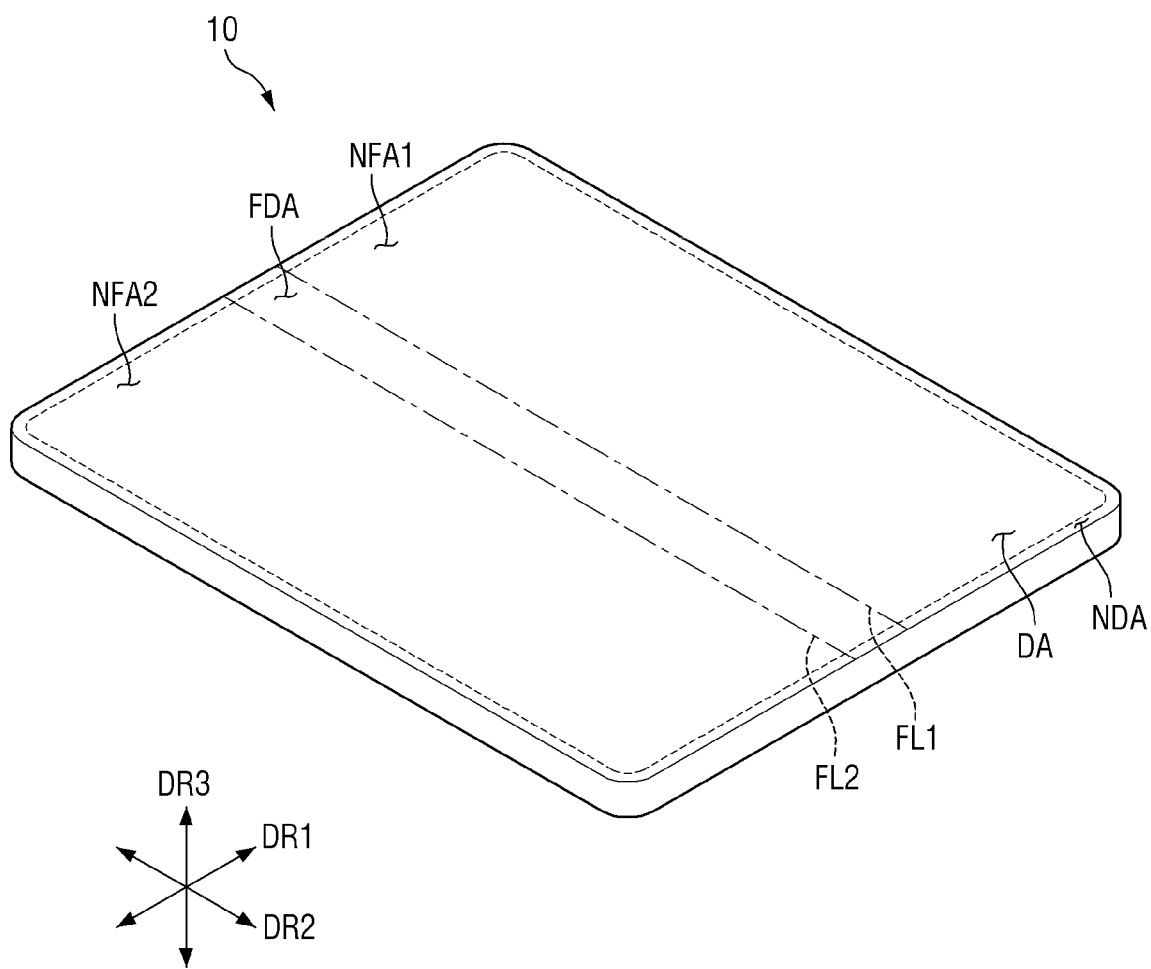
FIG. 1 is a perspective view illustrating a display device in an unfolded state according to an embodiment.

The present disclosure will now be described more fully hereinafter with reference to the accompanying drawings, in which embodiments of the present disclosure are shown. The present disclosure may, however, be embodied in different forms and should not be construed as limited to the embodiments described herein. Rather, these embodiments are provided so that this disclosure will be thorough and complete and will fully convey the scope of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Hereinafter, embodiments of the present disclosure will be described with reference to the accompanying drawings.

Figure 2:
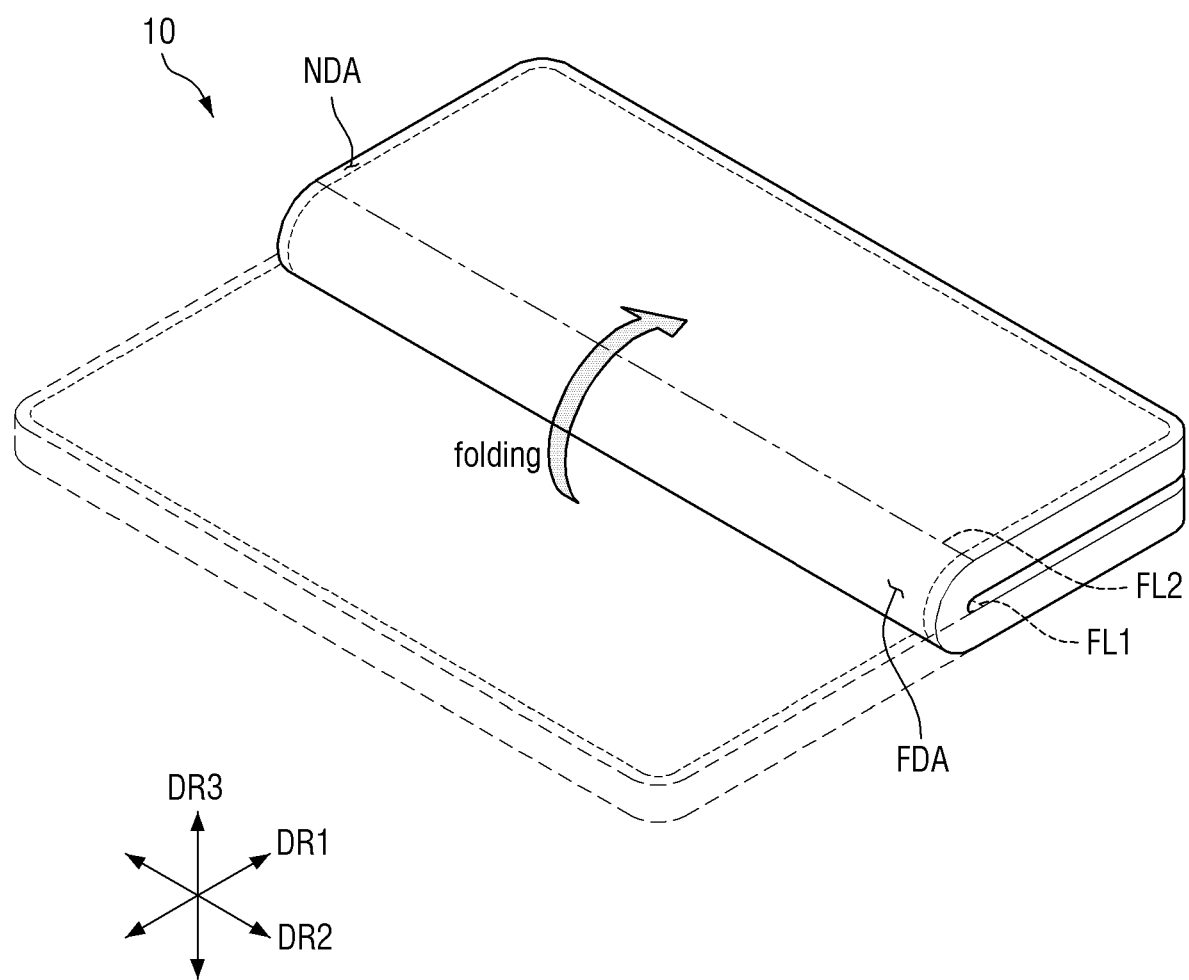
FIG. 2 is a perspective view illustrating the display device shown in FIG. 1 in a folded state.

FIG. 1 is a perspective view illustrating a display device 10 in an unfolded state according to an embodiment, and FIG. 2 is a perspective view illustrating the display device 10 in a folded state.

FIG. 1 illustrates the display device 10 in a first state in which it is not folded at (or along) folding lines FL1 and FL2, and FIG. 2 illustrates the display device 10 shown in FIG. 1 in a second state in which it is folded at the folding lines FL1 and FL2.

Referring to FIGS. 1 and 2, the display device 10, according to an embodiment, is a device for displaying moving images and/or still images. The display device 10 may be used as a display screen in portable electronic devices, such as mobile phones, smartphones, tablet personal computers (PCs), smart watches, watch phones, mobile communication terminals, electronic notebooks, electronic books, portable multimedia players (PMPs), navigation devices, and ultra-mobile PCs (UMPCs), as well as in various other products, such as televisions, notebook computers, monitors, billboards, and Internet of Things (IoT) devices.

In FIGS. 1 and 2, a first direction DR1 may be a direction parallel to a side of the display device 10 when seen in a plan view; for example, the first direction DR1 may be a horizontal direction of the display device 10. A second direction DR2 may be a direction parallel to another side of the display device 10 in contact with the above-discussed side of the display device 10 when seen in a plan view; for example, the second direction DR2 may be a vertical direction of the display device 10. A third direction DR3 may be a thickness direction of the display device 10.

The planar shape of the display device 10 may be a quadrilateral shape, such as a rectangular shape. Each corner of the display device 10 may have a right-angled planar shape or a round planar shape. A front surface of the display device 10 may have two short sides disposed in (or extending in or parallel to) the first direction DR1 and two long sides disposed in the second direction DR2.

The display device 10 may have a display area DA and a non-display area NDA. The planar shape of the display area DA may follow (or may correspond to) the shape of the display device 10. For example, when the display device 10 is rectangular in a plan view, the display area DA may also be rectangular in a plan view.

The display area DA may be an area including a plurality of pixels to display an image. The non-display area NDA may be an area which does not include pixels and, thus, does not display an image. The non-display area NDA may be disposed around (e.g., around a periphery of) the display area DA. The non-display area NDA may surround the display area DA in a plan view, but embodiments of the present disclosure are not limited thereto. The display area DA may also be partially surrounded by the non-display area NDA (e.g., the non-display area NDA may extend around only a portion of the periphery of the display area DA).

The display device 10 may maintain both the first state, which is the unfolded state, and the second state, which is the folded state. The display device 10 may be folded in an in-folding manner so that portions of the display area DA face each other, as illustrated in FIG. 2. In such an embodiment, portions of the front surface of the display device 10 may face each other. In other embodiments, the display device 10 may be folded in an out-folding manner so that portions of a rear surface of the display device 10 face each other.

The display device 10 may have a folding area FDA, a first non-folding area NFA1, and a second non-folding area NFA2. The folding area FDA may be an area at where the display device 10 is bent or folded. The first non-folding area NFA1 and the second non-folding area NFA2 may be areas in which the display device 10 is not bent or folded. For example, the first non-folding area NFA1 and the second non-folding area NFA2 may be flat areas of the display device 10.

The first non-folding area NFA1 may be disposed on a side (e.g., a right side) of the folding area FDA, and the second non-folding area NFA2 may be disposed on the other side (e.g., a left side) of the folding area FDA. The folding area FDA may be an area which is defined by a first folding line FL1 and a second folding line FL2 and an area in which the display device 10 is bent (e.g., is configured to be bent or folded) to have a curvature (e.g., a predetermined curvature). The first folding line FL1 may be a boundary between the folding area FDA and the first non-folding area NFA1, and the second folding line FL2 may be a boundary between the folding area FDA and the second non-folding area NFA2.

The first folding line FL1 and the second folding line FL2 may extend in the second direction DR2, as illustrated in FIGS. 1 and 2. In such an embodiment, the display device 10 may be folded along the second direction DR2. Therefore, because a length of the display device 10 in the first direction DR1 can be reduced by about half when the display device 10 is folded, a user can more easily carry the display device 10.

When the first folding line FL1 and the second folding line FL2 extend in the second direction DR2, as illustrated in FIGS. 1 and 2, a length of the folding area FDA in the second direction DR2 may be greater than a length of the folding area FDA in the first direction DR1. In addition, a length of the first non-folding area NFA1 in the second direction DR2 may be greater than a length of the first non-folding area NFA1 in the first direction DR1, and a length of the second non-folding area NFA2 in the second direction DR2 may be greater than a length of the second non-folding area NFA2 in the first direction DR1.

Each of the display area DA and the non-display area NDA may overlap at least one of the folding area FDA, the first non-folding area NFA1, and the second non-folding area NFA2. In FIGS. 1 and 2, each of the display area DA and the non-display area NDA overlaps the folding area FDA, the first non-folding area NFA1, and the second non-folding area NFA2.

Figure 3:
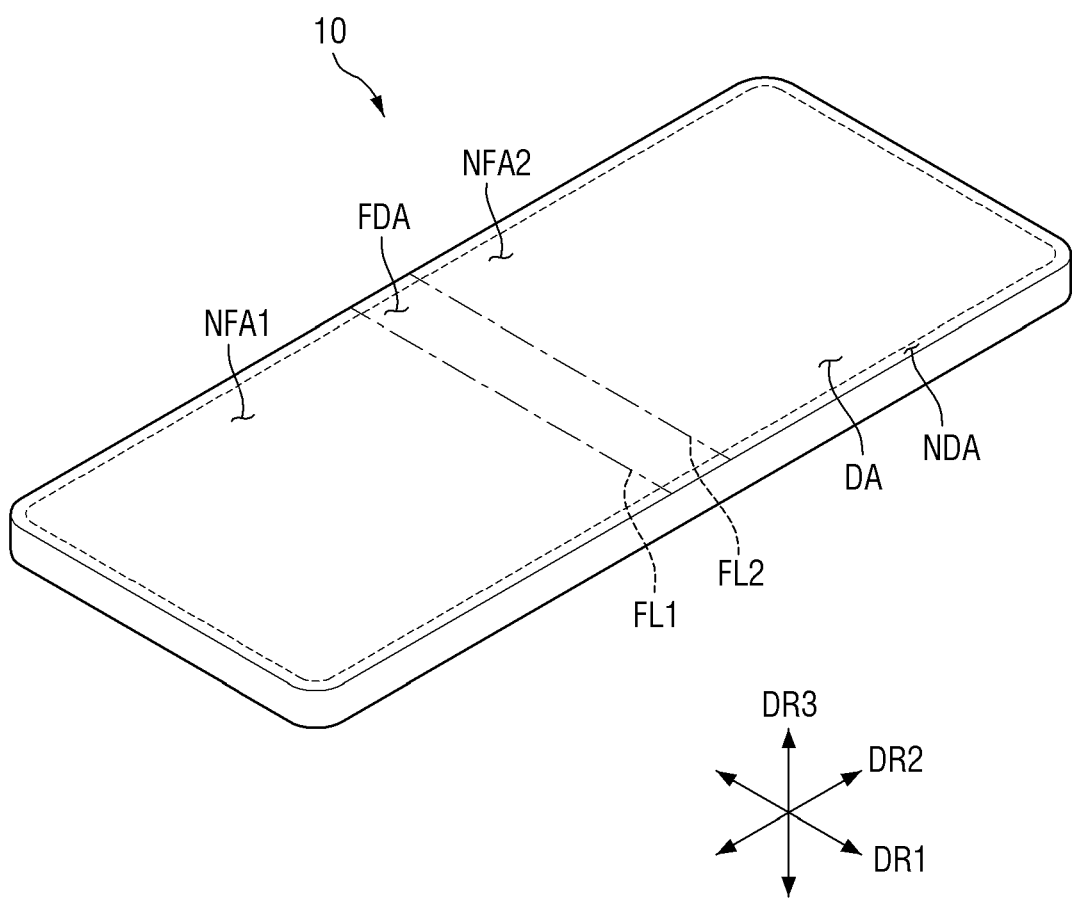
FIG. 3 is a perspective view illustrating a display device in an unfolded state according to an embodiment.
Figure 4:
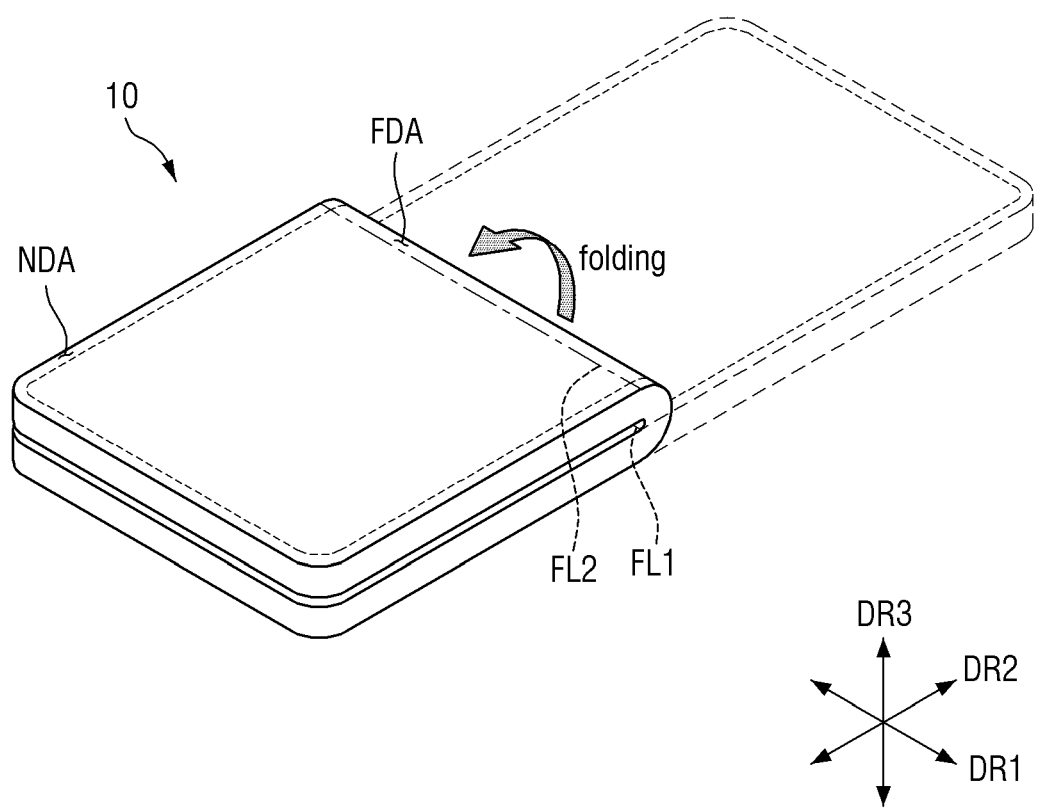
FIG. 4 is a perspective view illustrating the display device shown in FIG. 3 in a folded state.

FIG. 3 is a perspective view illustrating a display device 10 in an unfolded state of according to an embodiment, and FIG. 4 is a perspective view illustrating the display device 10 shown in FIG. 3 in a folded state.

FIG. 3 illustrates the display device 10 in a first state in which it is not folded at folding lines FL1 and FL2, and FIG. 4 illustrates the display device 10 in a second state in which it is folded at the folding lines FL1 and FL2.

The embodiment shown in FIGS. 3 and 4 differs from the embodiment shown in FIGS. 1 and 2 in that the first folding line FL1 and the second folding line FL2 extend in the first direction DR1 and the display device 10 is folded in the second direction DR2 and, thus, a length of the display device 10 in the second direction DR2 is reduced by about half when the display device 10 is folded. Therefore, in FIGS. 3 and 4, a description of elements and features identical or substantially similar to those of the embodiment shown in FIGS. 1 and 2 may be omitted or simplified.

Referring to FIGS. 3 and 4, in the first state in which the display device 10 is unfolded, long sides of the display device 10 may extend along the second direction DR2, and short sides of the display device 10 may extend along the first direction DR1.

The first folding line FL1 and the second folding line FL2 may extend in the first direction DR1, as illustrated in FIGS. 3 and 4. In such an embodiment, the display device 10 may be folded along (or folded in) the second direction DR2.

A first non-folding area NFA1 may be disposed on a side (e.g., a lower side) of a folding area FDA, and a second non-folding area NFA2 may be disposed on the other side (e.g., an upper side) of the folding area FDA.

When the first folding line FL1 and the second folding line FL2 extend in the first direction DR1, as illustrated in FIGS. 3 and 4, a length of the folding area FDA in the first direction DR1 may be greater than a length of the folding area FDA in the second direction DR2. In addition, a length of the first non-folding area NFA1 in the second direction DR2 may be greater than a length of the first non-folding area NFA1 in the first direction DR1, and a length of the second non-folding area NFA2 in the second direction DR2 may be greater than a length of the second non-folding area NFA2 in the first direction DR1.

Figure 5:
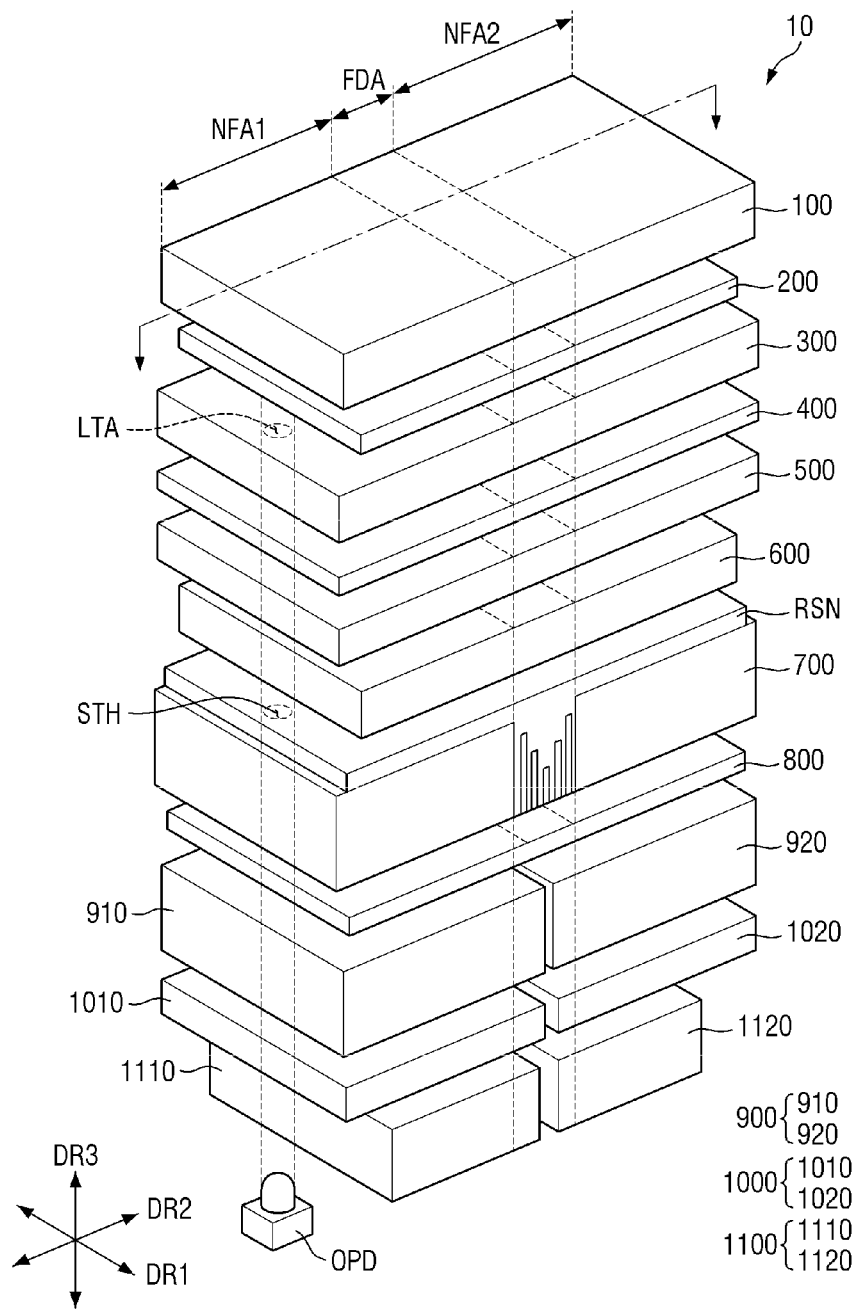
FIG. 5 is an exploded perspective view of a display device according to an embodiment.
Figure 6:
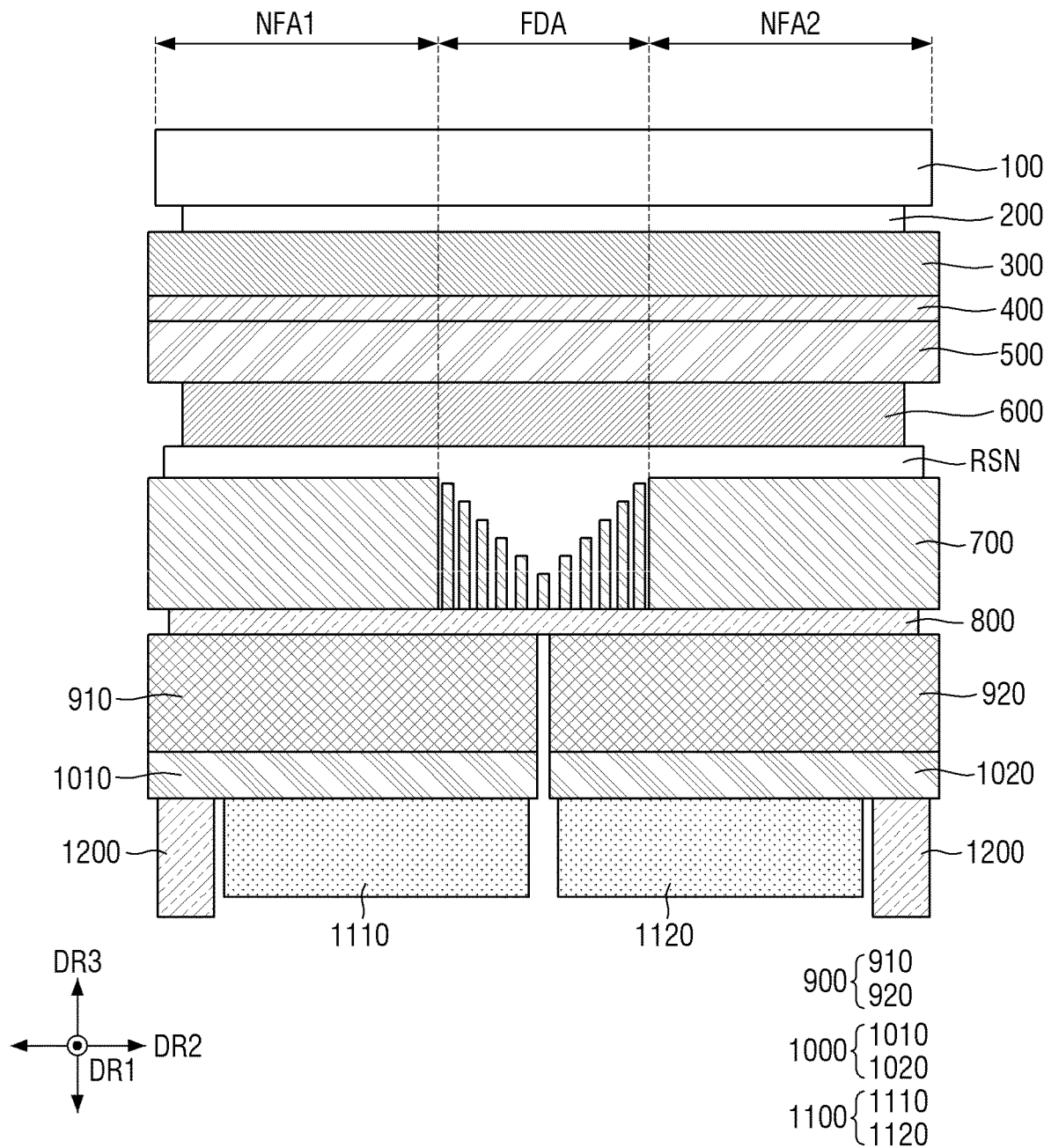
FIG. 6 is a cross-sectional view of the display device shown in FIG. 5.

FIG. 5 is an exploded perspective view of a display device 10 according to an embodiment. FIG. 6 is a cross-sectional view of the display device 10 according to the embodiment.

Referring to FIGS. 5 and 6, the display device 10, according to an embodiment, may include an upper protection member 100, a window member 200, a first adhesive member 300, a display panel 400, a panel protection member 500, an under-panel member 600, a base resin RSN, a panel support member 700, a second adhesive member 800, a digitizer member 900, a metal support member 1000, a buffer member 1100, and a third adhesive member 1200. The third adhesive member 1200 is not shown in FIG. 5 for ease of understanding.

The display panel 400 may be a panel configured to display an image. The display panel 400 may be an organic light emitting display panel including an organic light emitting layer, a quantum dot light emitting display panel including a quantum dot light emitting layer, an inorganic light emitting display panel using an inorganic semiconductor element as a light emitting element, or a micro light emitting display panel using a micro light emitting diode as a light emitting element. An embodiment in which the display panel 400 is an organic light emitting display panel will be primarily described below, but embodiments of the present disclosure are not limited thereto.

The display panel 400 may have a light transmitting area LTA overlapping (or aligned with) an optical device OPD in the third direction DR3. The optical device OPD may be an optical sensor configured to sense (or detect) light; for example, it may be a camera sensor, a proximity sensor, or an illuminance sensor. The light transmitting area LTA may be a part of (or may be arranged in) the display area DA.

The light transmitting area LTA may have (or may be) a transmitting area that is configured to transmit light (or transmit substantially more light than other areas of the display area DA). In some embodiments, the light transmitting area LTA may be a through-hole or opening passing through the display panel 400. The light transmittance of the light transmitting area LTA may be higher than the light transmittance of the display area DA at areas other than the light transmitting area LTA. In addition, the density or integration degree of pixels in the light transmitting area LTA may be lower than the density or integration degree of pixels in the display area DA other than the light transmitting area LTA due to the transmitting area of the light transmitting area LTA. For example, the number of pixels per unit area in the light transmitting area LTA may be smaller than the number of pixels per unit area in the display area DA other than the light transmitting area LTA. In some embodiments, the pixels per inch (PPI) in the light transmitting area LTA may be smaller than the PPI in the display area DA other than the light transmitting area LTA.

The window member 200 may be attached onto a front surface of the display panel 400 by the first adhesive member 300. The window member 200 may be made of a transparent material, for example, glass or plastic. For example, the window member 200 may be an ultra-thin glass (UTG) having a thickness of about 0.1 mm or less or may be a transparent polyimide film. The first adhesive member 300 may be a transparent adhesive film or a transparent adhesive resin.

The upper protection member 100 may be disposed on a front surface of the window member 200. The upper protection member 100 may be attached to the front surface of the window member 200. The upper protection member 100 may provide at least shatter prevention, shock absorption, dent prevention, fingerprint prevention, and/or anti-glare functions for the window member 200.

A light blocking pattern may be formed on a rear surface of the upper protection member 100. The light blocking pattern may be disposed on or adjacent to edges of the upper protection member 100. The light blocking pattern may include a light blocking material that is configured to block (or substantially block) light. For example, the light blocking pattern may be an inorganic black pigment, such as carbon black, an organic block pigment, or an opaque metal material.

The panel protection member 500 may be disposed on a rear surface of the display panel 400. The panel protection member 500 may support the display panel 400 and may protect the rear surface of the display panel 400. The panel protection member 500 may be a plastic, such as polyethylene terephthalate (PET) or polyimide. Although the panel protection member 500 is disposed in (e.g., overlaps) a folding area FDA of the display device 10 in FIGS. 5 and 6, embodiments of the present disclosure are not limited thereto. For example, in other embodiments, the panel protection member 500 may be removed from (e.g., may not overlap) the folding area FDA of the display device 10 so that the display device 10 can be more smoothly folded. For example, in some embodiments, the panel protection member 500 may be provided in a plurality and may be spaced apart at the folding area FDA of the display device 10.

The under-panel member 600 may be disposed on a rear surface of the panel protection member 500. The under-panel member 600 may include a light blocking layer for absorbing light incident from the outside, a buffer layer for absorbing external shock, and/or a heat dissipating layer for efficiently dissipating heat from the display panel 400.

The light blocking layer is configured to block transmission of light to prevent other elements disposed under the light blocking layer, for example, the digitizer member 900, from being seen from above the display panel 400. The light blocking layer may include a light absorbing material, such as a black pigment or a black dye.

The buffer layer absorbs external shock to prevent the display panel 400 from being damaged. The buffer layer may be a single layer or may include a plurality of layers. For example, the buffer layer may be made of polymer resin, such as polyurethane, polycarbonate, polypropylene, or polyethylene, or may be made of an elastic material, such as rubber, a urethane-based material, or a sponge formed by foam molding an acrylic-based material.

The heat dissipating layer may include a first heat dissipating layer including graphite or carbon nanotubes and a second heat dissipating layer made of a metal thin film, such as copper, nickel, ferrite, or silver, capable of shielding electromagnetic waves and having excellent heat conductivity.

The panel support member 700 may be disposed on a rear surface of the under-panel member 600. The panel support member 700 may be a rigid member that does not easily change shape or volume by external pressure. Because the panel support member 700 is disposed on the rear surface of the display panel 400 and is a rigid member that is not easily changed in shape or volume by external pressure, it supports the display panel 400.

In an embodiment, the panel support member 700 may be a polymer including carbon fibers or glass fibers. In such an embodiment, the panel support member 700 may allow a magnetic field or electromagnetic signal of the digitizer member 900 to pass therethrough because it is made of a polymer including carbon fibers or glass fibers. Therefore, the panel support member 700 may support the display panel 400 while not reducing the touch sensitivity of the digitizer member 900.

In an embodiment, the panel support member 700 may be a metal plate. For example, the panel support member 700 may be a metal plate made of a metal or a metal alloy. The panel support member 700 may include, but is not limited to, copper (Cu), aluminum (Al), stainless steel (SUS), and/or an alloy thereof.

For ease of description, an embodiment in which the panel support member 700 is made of a polymer including carbon fibers or glass fibers will be described below as an example, but embodiments of the present disclosure are not limited thereto.

The panel support member 700 may have a through-hole (e.g., an opening) STH overlapping (e.g., aligned with) the optical device OPD in the third direction DR3. The through-hole STH may overlap (e.g., may be aligned with) the light transmitting area LTA of the display panel 400 in the third direction DR3. The area of the through-hole STH may be larger than the area of the light transmitting area LTA. The optical device OPD may be configured to sense light incident from a front surface of the display device 10 through the light transmitting area LTA and the through-hole STH.

The panel support member 700 may include a lattice pattern in the folding area FDA so that the folding area FDA can be more easily bent. In addition, the panel support member 700 including a lattice pattern in the folding area FDA can be more easily bent when the display device 10 is folded.

The panel support member 700 will be described in more detail with reference to FIGS. 8 through 10.

The base resin RSN may be disposed on the panel support member 700 and may also be disposed inside the panel support member 700. For example, the base resin RSN may be disposed on an upper surface of the panel support member 700. In addition, the base resin RSN may be disposed inside the through-hole STH, slits SLT (see, e.g., FIG. 8), and first through third layers L1 through L3 (see, e.g., FIG. 10) of the panel support member 700, which will be described later. In addition, the base resin RSN may be disposed between fiber yarns CF1 through CF3 (see, e.g., FIG. 10) of the panel support member 700, which will be described later.

In some embodiments, the base resin RSN may be formed as a single piece. However, embodiments of the present disclosure are not limited thereto, and the base resin RSN may include a plurality of resins (e.g., a plurality of separately formed resins) spaced apart by the panel support member 700.

The base resin RSN disposed on the upper surface and inside of the panel support member 700 may reduce or minimize an impact applied to the panel support member 700 when the display device 10 is folded. The base resin RSN may include an epoxy resin, a polyester resin, a polyamide resin, a polycarbonate resin, a polypropylene resin, a polybutylene resin, a polyacrylate resin, and/or a vinyl ester resin.

The digitizer member 900 may include a first digitizer member 910 and a second digitizer member 920. The first digitizer member 910 and the second digitizer member 920 may be disposed on a rear surface of the panel support member 700. The first digitizer member 910 and the second digitizer member 920 may be attached to the rear surface of the panel support member 700 by the second adhesive member 800. The second adhesive member 800 may be a pressure sensitive adhesive (PSA).

The first digitizer member 910 and the second digitizer member 920 may not be disposed in the folding area FDA to reduce folding stress of the display device 10. The first digitizer member 910 may be disposed in a first non-folding area NFA1, and the second digitizer member 920 may be disposed in a second non-folding area NFA2. A gap between the first digitizer member 910 and the second digitizer member 920 may overlap the folding area FDA and may be smaller than a width of the folding area FDA. The width of the folding area FDA may be a length of the folding area FDA in the second direction DR2.

The first digitizer member 910 and the second digitizer member 920 may include electrode patterns for sensing the approach or touch of an electronic pen, such as a stylus pen, that supports electromagnetic resonance (EMR). The first digitizer member 910 and the second digitizer member 920 may be configured to sense a magnetic field or electromagnetic signal emitted from the electronic pen based on the electrode patterns and may determine a point at which the sensed magnetic field or electromagnetic signal is greatest as a touch coordinate.

Magnetic metal power may be disposed on a rear surface of the first digitizer member 910 and a rear surface of the second digitizer member 920. In such an embodiment, a magnetic field or an electromagnetic signal passing through the first digitizer member 910 and the second digitizer member 920 may flow into the magnetic metal powder. Therefore, the emission of an magnetic field or electromagnetic signal of the first digitizer member 910 and the second digitizer member 920 to a rear surface of the display device 10 may be reduced due to the magnetic metal powder.

The metal support member 1000 may include a first metal support member 1010 and a second metal support member 1020. The first metal support member 1010 may be disposed on the rear surface of the first digitizer member 910, and the second metal support member 1020 may be disposed on the rear surface of the second digitizer member 920.

The first metal support member 1010 and the second metal support member 1020 may not be disposed in the folding area FDA to reduce folding stress of the display device 10. The first metal support member 1010 may be disposed in the first non-folding area NFA1, and the second metal support member 1020 may be disposed in the second non-folding area NFA2. A gap between the first metal support member 1010 and the second metal support member 1020 may overlap the folding area FDA and may be smaller than the width of the folding area FDA.

The first metal support member 1010 and the second metal support member 1020 may include a material having high rigidity to support the first digitizer member 910 and the second digitizer member 920. For example, the first metal support member 1010 and the second metal support member 1020 may include stainless steel, such as SUS316 (a stainless steel variety including more nickel and some molybdenum compared to other stainless steel varieties, such as SUS304).

The buffer member 1100 may include a first buffer member 1110 and a second buffer member 1120. The first buffer member 1110 and the second buffer member 1120 may absorb external shock to prevent the panel support member 700 and the digitizer member 900 from being damaged. The first buffer member 1110 and the second buffer member 1120 may include an elastic material, such as rubber, a urethane-based material, or a sponge formed by foam molding an acrylic-based material.

The first buffer member 1110 may be disposed on a rear surface of the first metal support member 1010, and the second buffer member 1120 may be disposed on a rear surface of the second metal support member 1020. The first buffer member 1110 and the second buffer member 1120 may not be disposed in the folding area FDA to reduce folding stress of the display device 10. The first buffer member 1110 may be disposed in the first non-folding area NFA1, and the second buffer member 1120 may be disposed in the second non-folding area NFA2. A gap between the first buffer member 1110 and the second buffer member 1120 may overlap the folding area FDA and may be smaller than the width of the folding area FDA.

The third adhesive member 1200 may be disposed on the rear surface of the first metal support member 1010 and the rear surface of the second metal support member 1020. The third adhesive member 1200 may be disposed on edges of the first metal support member 1010 and edges of the second metal support member 1020. The third adhesive member 1200 may surround in a plan view the first buffer member 1110 and the second buffer member 1120. The third adhesive member 1200 may be a waterproof tape or a waterproof member for attaching the rear surface of the first metal support member 1010 and the second metal support member 1020 to a front surface of a frame disposed on a rear surface of the buffer member 1100. Therefore, the third adhesive member 1200 may prevent moisture or dust from penetrating into the display device 10, such that a waterproof and dustproof display device 10 can be provided.

In an embodiment, the third adhesive member 1200 may not surround the first buffer member 1110 and the second buffer member 1120 and may overlap, in the third direction DR3, a magnet to maintain the display device 10 in the folded state. In such an embodiment, the third adhesive member 1200 may act as a magnetic shielding member for shielding the digitizer member 900 and the display panel 400 to prevent them from being affected by the magnetism of the magnet.

Figure 7:
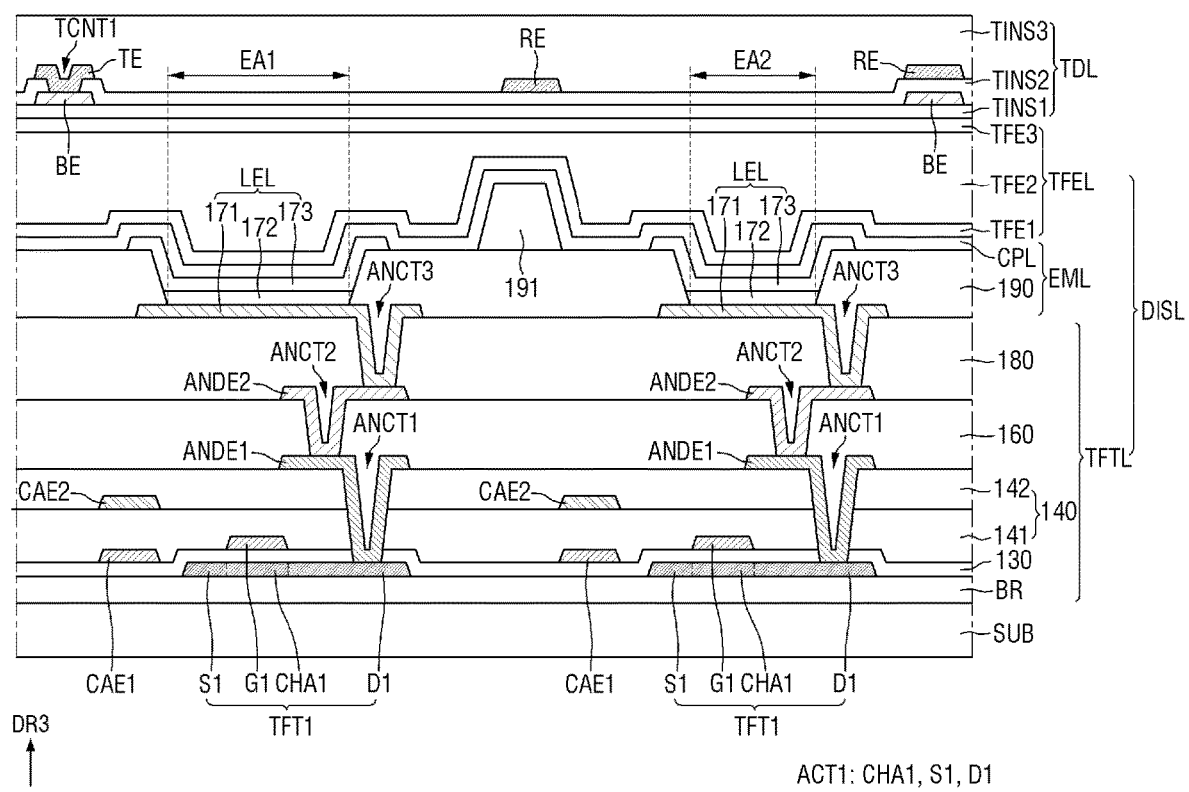
FIG. 7 is a cross-sectional view of a display panel according to an embodiment.

FIG. 7 is a cross-sectional view of a display panel according to an embodiment.

Referring to FIG. 7, a display layer DISL may be disposed on a substrate SUB. The display layer DISL may include a thin-film transistor layer TFTL, a light emitting element layer EML, and an encapsulation layer TFEL.

The thin-film transistor layer TFTL may be disposed on the substrate SUB. The thin-film transistor layer TFTL may include a barrier layer BR, thin-film transistors TFT1, first capacitor electrodes CAE1, second capacitor electrodes CAE2, first anode connection electrodes ANDE1, second anode connection electrodes ANDE2, a gate insulating layer 130, a first interlayer insulating film 141, a second interlayer insulating film 142, a first planarization layer 160, and a second planarization layer 180.

The substrate SUB may be made of an insulating material, such as a polymer resin. For example, the substrate SUB may be made of polyimide. The substrate SUB may be a flexible substrate that can be bent, folded, rolled, and the like.

The barrier layer BR may be disposed on the substrate SUB. The barrier layer BR is a layer for protecting transistors of the thin-film transistor layer TFTL and light emitting layers 172 of the light emitting element layer EML from moisture introduced through the substrate SUB, which is vulnerable to moisture penetration. The barrier layer BR may include a plurality of inorganic layers stacked alternately. For example, the barrier layer BR may have a multilayer structure in which one or more inorganic layers selected from a silicon nitride layer, a silicon oxynitride layer, a silicon oxide layer, a titanium oxide layer, and an aluminum oxide layer are alternately stacked.

The thin-film transistors TFT1 may be disposed on the barrier layer BR. An active layer ACT1 of each of the thin-film transistors TFT1 may be disposed on the barrier layer BR. The active layer ACT1 of each of the thin-film transistors TFT1 may include polycrystalline silicon, monocrystalline silicon, low-temperature polycrystalline silicon, amorphous silicon, or an oxide semiconductor.

The active layer ACT1 may have a channel region CHA1, a source region S1, and a drain region D1. The channel region CHA1 may be a region overlapped by a gate electrode G1 in the third direction DR3, which is the thickness direction of the substrate SUB. The source region S1 may be disposed on a side of the channel region CHA1, and the drain region D1 may be disposed on the other side of the channel region CHA1. The source region S1 and the drain region D1 may be regions not overlapped by the gate electrode G1 in the third direction DR3 (e.g., the source region S1 and the drain region D1 may be offset from the gate electrode G1 in the third direction DR3). The source region S1 and the drain region D1 may be regions formed to have conductivity by doping a silicon semiconductor or an oxide semiconductor with ions or impurities.

The gate insulating layer 130 may be disposed on the active layers ACT1 of the thin-film transistors TFT1. The gate insulating layer 130 may be made of an inorganic layer, such as a silicon nitride layer, a silicon oxynitride layer, a silicon oxide layer, a titanium oxide layer, or an aluminum oxide layer.

The gate electrodes G1 of the thin-film transistors TFT1 and the first capacitor electrodes CAE1 may be disposed on the gate insulating layer 130. The gate electrodes G1 may overlap the channel regions CHA1 in the third direction DR3, as described above. Although the gate electrodes G1 and the first capacitor electrodes CAE1 are spaced apart from each other in the embodiment shown in FIG. 7, in some embodiments, they may be connected to each other and/or integrally formed. Each of the gate electrodes G1 and the first capacitor electrodes CAE1 may be a single layer or may have a multilayer structure including any one or more of molybdenum (Mo), aluminum (Al), chromium (Cr), gold (Au), titanium (Ti), nickel (Ni), neodymium (Nd), copper (Cu), and alloys thereof.

The first interlayer insulating film 141 may be disposed on the gate electrodes G1 of the thin-film transistors TFT1 and the first capacitor electrodes CAE1. The first interlayer insulating film 141 may be made of an inorganic layer, such as a silicon nitride layer, a silicon oxynitride layer, a silicon oxide layer, a titanium oxide layer, or an aluminum oxide layer. The first interlayer insulating film 141 may include a plurality of inorganic layers.

The second capacitor electrodes CAE2 may be disposed on the first interlayer insulating film 141. The second capacitor electrodes CAE2 may overlap the first capacitor electrodes CAE1 in the third direction DR3. In addition, in an embodiment in which the gate electrodes G1 and the first capacitor electrodes CAE1 are integrally formed, the second capacitor electrodes CAE2 may overlap the gate electrodes G1 in the third direction DR3. Because the first interlayer insulating film 141 has a dielectric constant (e.g., a known or predetermined dielectric constant), the first capacitor electrodes CAE1, the second capacitor electrodes CAE2, and the first interlayer insulating film 141 disposed between them may form capacitors. Each of the second capacitor electrodes CAE2 may be a single layer or may have a multilayer structure including any one or more of molybdenum (Mo), aluminum (Al), chromium (Cr), gold (Au), titanium (Ti), nickel (Ni), neodymium (Nd), copper (Cu), and alloys thereof.

The second interlayer insulating film 142 may be disposed on the second capacitor electrodes CAE2. The second interlayer insulating film 142 may be made of an inorganic layer, such as a silicon nitride layer, a silicon oxynitride layer, a silicon oxide layer, a titanium oxide layer, or an aluminum oxide layer. The second interlayer insulating film 142 may include a plurality of inorganic layers.

The first anode connection electrodes ANDE1 may be disposed on the second interlayer insulating film 142. Each of the first anode connection electrodes ANDE1 may be connected to the drain region D1 of a corresponding thin-film transistor TFT1 through a first connection contact hole ANCT1 penetrating (or extending through) the gate insulating layer 130, the first interlayer insulating film 141, and the second interlayer insulating film 142. Each of the first anode connection electrodes ANDE1 may be a single layer or may have a multilayer structure including any one or more of molybdenum (Mo), aluminum (Al), chromium (Cr), gold (Au), titanium (Ti), nickel (Ni), neodymium (Nd), copper (Cu), and alloys thereof.

The first planarization layer 160 may be disposed on the first anode connection electrodes ANDE1 to planarize steps due to the thin-film transistors TFT1. The first planarization layer 160 may be made of an organic layer, such as an acryl resin, an epoxy resin, a phenolic resin, a polyamide resin, or a polyimide resin.

The second anode connection electrodes ANDE2 may be disposed on the first planarization layer 160. Each of the second anode connection electrodes ANDE2 may be connected to a corresponding first anode connection electrode ANDE1 through a second connection contact hole ANCT2 penetrating (or extending through) the first planarization layer 160. Each of the second anode connection electrodes ANDE2 may be a single layer or may have a multilayer structure including any one or more of molybdenum (Mo), aluminum (Al), chromium (Cr), gold (Au), titanium (Ti), nickel (Ni), neodymium (Nd), copper (Cu), and alloys thereof.

The second planarization layer 180 may be disposed on the second anode connection electrodes ANDE2. The second planarization layer 180 may be made of an organic layer, such as an acryl resin, an epoxy resin, a phenolic resin, a polyamide resin, or a polyimide resin.

The light emitting element layer EML including light emitting elements LEL and a bank 190 may be disposed on the second planarization layer 180. Each of the light emitting elements LEL includes a pixel electrode 171, the light emitting layer 172, and a common electrode 173.

The pixel electrode 171 may be disposed on the second planarization layer 180. The pixel electrode 171 may be connected to a corresponding one of the second anode connection electrodes ANDE2 through a third connection contact hole ANCT3 penetrating (or extending through) the second planarization layer 180.

In a top emission structure, in which light is emitted from the light emitting layer 172 toward the common electrode 173, the pixel electrode 171 may be made of a metal material having high reflectivity and may have a stacked structure of aluminum and titanium (e.g., Ti/Al/Ti), a stacked structure of aluminum and indium tin oxide (e.g., ITO/Al/ITO), a stacked structure of silver and indium tin oxide (e.g., ITO/Ag/ITO), an APC alloy (e.g., an alloy of silver (Ag), palladium (Pd), and copper (Cu)), or a stacked structure of an APC alloy and indium tin oxide (e.g., ITO/APC/ITO).

The bank 190 may be formed on the second planarization layer 180 to separate the pixel electrodes 171 and to define emission portions EA1 and EA2. The bank 190 may cover edges of the pixel electrodes 171. The bank 190 may be made of an organic layer, such as an acryl resin, an epoxy resin, a phenolic resin, a polyamide resin, or a polyimide resin.

Each of a first emission portion EA1 and a second emission portion EA2 is an area in which the pixel electrode 171, the light emitting layer 172, and the common electrode 173 are sequentially stacked so that holes from the pixel electrode 171 and electrons from the common electrode 173 recombine together in the light emitting layer 172 to emit light.

The light emitting layer 172 may be disposed on the pixel electrode 171 and the bank 190. The light emitting layer 172 may include an organic material to emit light of a color (e.g., light of a certain or predetermined color). In one embodiment, the light emitting layer 172 includes a hole transporting layer, an organic material layer, and an electron transporting layer.

The common electrode 173 may be disposed on the light emitting layer 172. The common electrode 173 may cover the light emitting layer 172. The common electrode 173 may be a common layer formed commonly on the first emission portion EA1 and the second emission portion EA2. In some embodiments, a capping layer CPL may be formed on the common electrode 173.

In the top emission structure, the common electrode 173 may be made of a transparent conductive material (TCO) that can transmit light, such as indium tin oxide (ITO) or indium zinc oxide (IZO), or a semi-transmissive conductive material, such as magnesium (Mg), silver (Ag), or an alloy of Mg and Ag. When the common electrode 173 is made of a semi-transmissive conductive material, light output efficiency may be increased by a microcavity structure.

A spacer 191 may be disposed on the bank 190. The spacer 191 may support a mask during a process of manufacturing the light emitting layers 172. The spacer 191 may be made of an organic layer, such as an acryl resin, an epoxy resin, a phenolic resin, a polyamide resin, or a polyimide resin.

The encapsulation layer TFEL may be disposed on the common electrodes 173 (or on the capping layer CPL, when present). The encapsulation layer TFEL may include at least one inorganic layer to prevent oxygen or moisture from permeating into the light emitting element layer EML and may include at least one organic layer to protect the light emitting element layer EML from foreign substances, such as dust. For example, the encapsulation layer TFEL may include a first encapsulating inorganic layer TFE1, an encapsulating organic layer TFE2, and a second encapsulating inorganic layer TFE3.

The first encapsulating inorganic layer TFE1 may be disposed on the common electrodes 173, the encapsulating organic layer TFE2 may be disposed on the first encapsulating inorganic layer TFE1, and the second encapsulating inorganic layer TFE3 may be disposed on the encapsulating organic layer TFE2. Each of the first encapsulating inorganic layer TFE1 and the second encapsulating inorganic layer TFE3 may have a multilayer structure in which one or more inorganic layers selected from a silicon nitride layer, a silicon oxynitride layer, a silicon oxide layer, a titanium oxide layer, and an aluminum oxide layer are alternately stacked. The encapsulating organic layer TFE2 may be an organic layer, such as an acryl resin, an epoxy resin, a phenolic resin, a polyamide resin, or a polyimide resin.

A touch sensing layer TDL may be disposed on the encapsulation layer TFEL. The touch sensing layer TDL includes a first touch insulating layer TINS1, connection electrodes BE, a second touch insulating layer TINS2, driving electrodes TE, sensing electrodes RE, and a third touch insulating layer TINS3.

The first touch insulating layer TINS1 may be disposed on the encapsulation layer TFEL. The first touch insulating layer TINS1 may be made of an inorganic layer, such as a silicon nitride layer, a silicon oxynitride layer, a silicon oxide layer, a titanium oxide layer, or an aluminum oxide layer.

The connection electrodes BE may be disposed on the first touch insulating layer TINS1. Each of the connection electrodes BE may be a single layer or may have a multi-layer structure include any one or more of molybdenum (Mo), aluminum (Al), chromium (Cr), gold (Au), titanium (Ti), nickel (Ni), neodymium (Nd), copper (Cu), and alloys thereof.

The second touch insulating layer TINS2 may be disposed on the connection electrodes BE. The second touch insulating layer TINS2 may be made of an inorganic layer, such as a silicon nitride layer, a silicon oxynitride layer, a silicon oxide layer, a titanium oxide layer, or an aluminum oxide layer. In other embodiments, the second touch insulating layer TINS2 may be made of an organic layer, such as an acryl resin, an epoxy resin, a phenolic resin, a polyamide resin, or a polyimide resin.

The driving electrodes TE and the sensing electrodes RE may be disposed on the second touch insulating layer TINS2. Each of the driving electrodes TE and the sensing electrodes RE may be a single layer or may have a multi-layer structure include any one or more of molybdenum (Mo), aluminum (Al), chromium (Cr), gold (Au), titanium (Ti), nickel (Ni), neodymium (Nd), copper (Cu), and alloys thereof.

The driving electrodes TE and the sensing electrodes RE may overlap the connection electrodes BE in the third direction DR3. Each of the driving electrodes TE may be connected to a connection electrode BE through a touch contact hole TCNT1 penetrating (or extending through) the second touch insulating layer TINS2.

The third touch insulating layer TINS3 may be formed on the driving electrodes TE and the sensing electrodes RE. The third touch insulating layer TINS3 may planarize steps formed by the driving electrodes TE, the sensing electrodes RE, and the connection electrodes BE. The third touch insulating layer TINS3 may be made of an organic layer, such as an acryl resin, an epoxy resin, a phenolic resin, a polyamide resin, or a polyimide resin.

Figure 8:
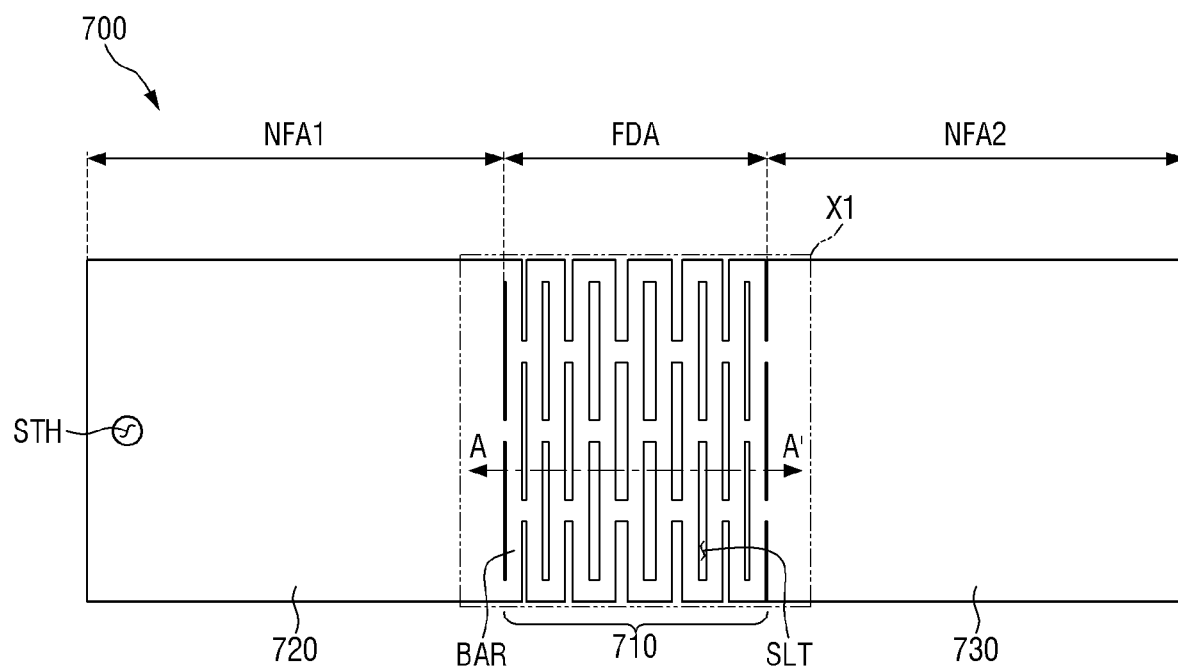
FIG. 8 is a plan view of a panel support member according to an embodiment.

FIG. 8 is a plan view of a panel support member 700 according to an embodiment. FIG. 9 is an enlarged view of the portion X1 of FIG. 8 according to the embodiment. FIG.

Figure 11:
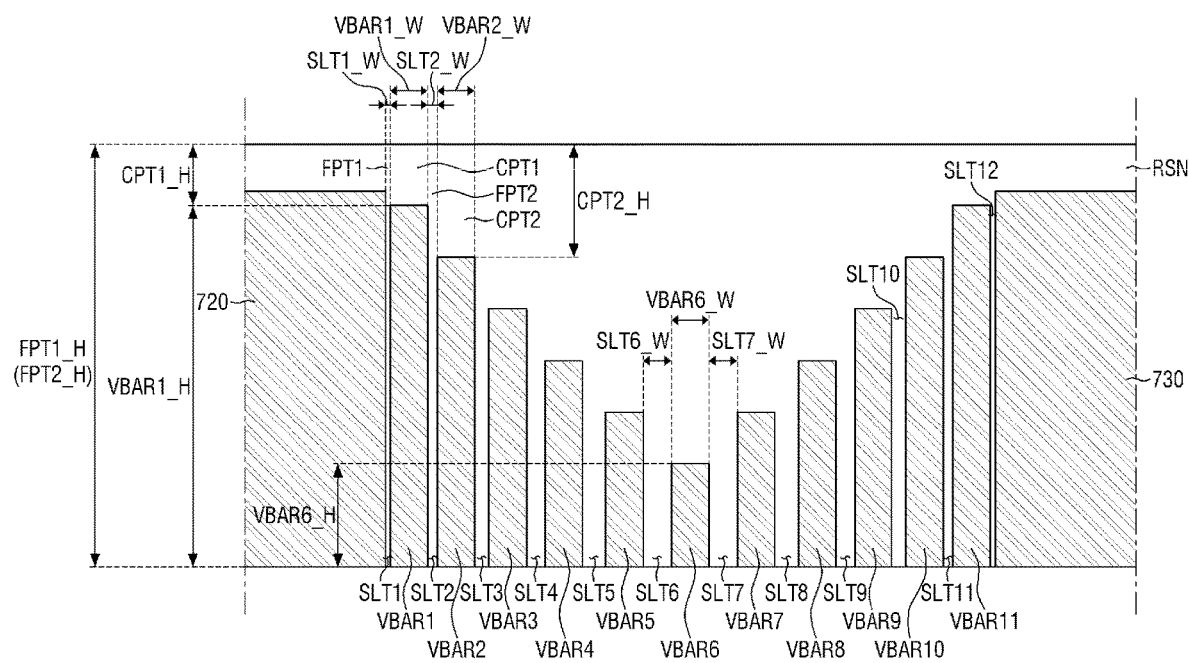
FIG. 11 is a cross-sectional view schematically illustrating the panel support member and a base resin according to the embodiment shown in FIG. 8.

10 is a cross-sectional view taken along the line A-A' of FIG. 8. FIG. 11 is a cross-sectional view schematically illustrating the panel support member 700 and a base resin RSN according to an embodiment.

Figure 9:
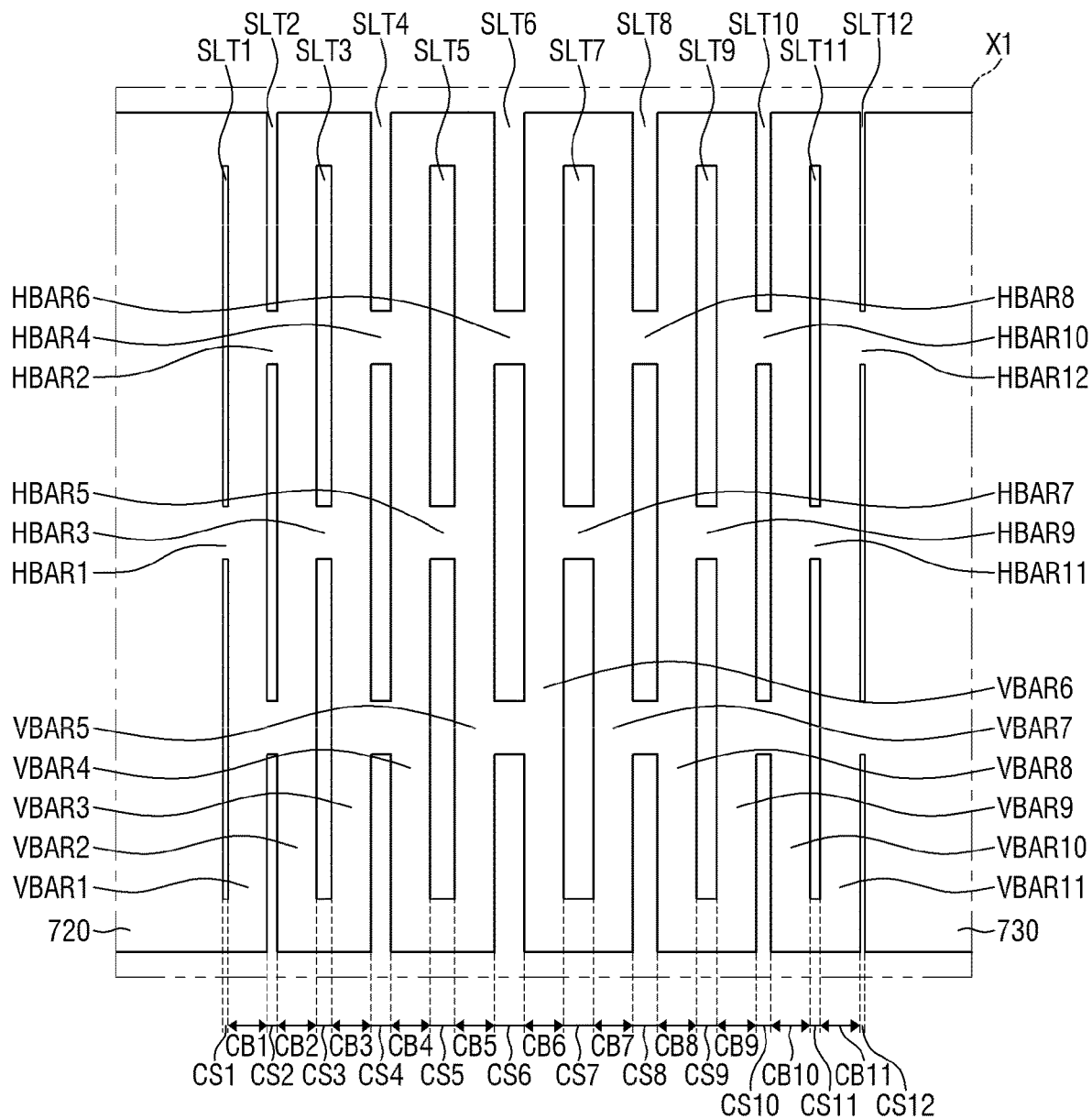
FIG. 9 is an enlarged view of the portion X1 of FIG. 8 according to an embodiment.
Figure 10:
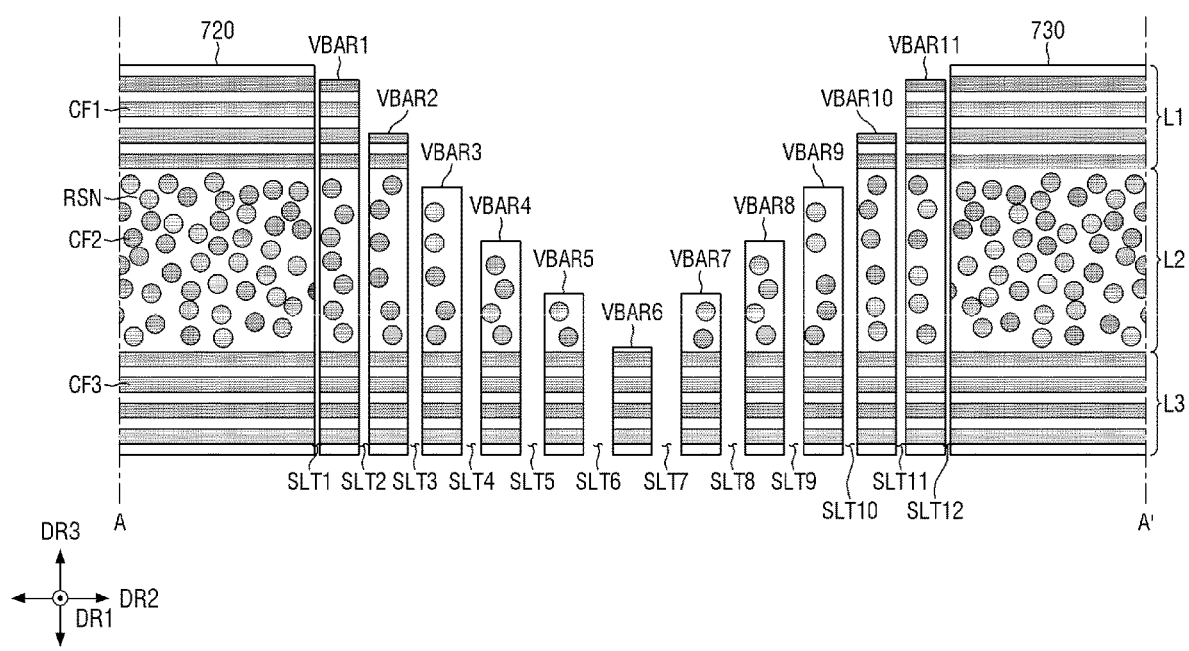
FIG. 10 is a cross-sectional view taken along the line A-A' of FIG. 8.

Referring to FIGS. 8 through 11, the panel support member 700 may be made of a polymer including fiber yarns CF1 through CF3 and the base resin RSN (see, e.g., FIG. 10). The fiber yarns CF1 through CF3 may include carbon fibers or glass fibers.

In an embodiment in which the fiber yarns CF1 through CF3 include carbon fibers, the base resin RSN may be epoxy, polyester, polyamide, polycarbonate, polypropylene, polybutylene, or vinyl ester. In an embodiment in which the fiber yarns CF1 through CF3 include glass fibers, the base resin RSN may be epoxy, polyester, polyamide, or vinyl ester.

The panel support member 700 may include a first layer L1, a second layer L2, and a third layer L3 as illustrated in FIG. 10.

The first layer L1 may be a pre-impregnated material including first fiber yarns CF1 extending in the second direction DR2. The first layer L1 may include the base resin RSN disposed between the first fiber yarns CF1.

The second layer L2 may be a pre-impregnated material including second fiber yarns CF2 extending in the first direction DR1. The second layer L2 may include the base resin RSN disposed between the second fiber yarns CF2.

The third layer L3 may be a pre-impregnated material including third fiber yarns CF3 extending in the second direction DR2. The third layer L3 may include the base resin RSN disposed between the third fiber yarns CF3.

Each of the first fiber yarns CF1, the second fiber yarns CF2, and the third fiber yarns CF3 may be a carbon fiber yarn or a glass fiber yarn. Each of the first fiber yarns CF1, the second fiber yarns CF2, and the third fiber yarns CF3 may have a width in a range of about 7 µm to about 10 µm, but embodiments of the present disclosure are not limited thereto.

The first layer L1, the second layer L2, and the third layer L3 may be stacked by hot pressing or by using an autoclave. The first direction DR1 and the second direction DR2 may be orthogonal to each other. In addition, the first direction DR1 may be parallel to the first folding line FL1 and the second folding line FL2.

The direction in which the second fiber yarns CF2 in the second layer L2 extend and the direction in which the folding lines FL1 and FL2 extend are the same, that is, the first direction DR1. Therefore, the second layer L2 can be easily folded when the display device 10 is folded. However, if the panel support member 700 included only the second layer L2 having the second fiber yarns CF2, it may be too easily bent or curved in the first direction DR1. That is, if the panel support member 700 included only the second layer L2 having the second fiber yarns CF2, the flatness and rigidity of the panel support member 700 may be low.

Thus, according to embodiments of the present disclosure, the panel support member 700 includes not only the second layer L2 but also the first layer L1 having the first fiber yarns CF1 extending in the second direction DR2 and the third layer L3 having the third fiber yarns CF3 extending in the second direction DR2. Therefore, the panel support member 700 can be prevented from being curved or bent in the first direction DR1, and the rigidity of the panel support member 700 can be increased.

In some embodiments, a thickness of the second layer L2 may be greater than a thickness of the first layer L1 and a thickness of the third layer L3 in consideration of the folding direction of the panel support member 700. The thickness of the first layer L1 and the thickness of the third layer L3 may be substantially the same, but embodiments of the present disclosure are not limited thereto. For example, the thickness of the second layer L2 may be about 120 µm, and the thickness of the first layer L1 and the thickness of the third layer L3 may be in a range of about 20 µm to about 30 µm.

A thickness of the panel support member 700 may be greater than a thickness of the digitizer member 900. In addition, the thickness of the panel support member 700 may be greater than a thickness of the display panel 400. For example, the thickness of the panel support member 700 may be in a range of about 100 µm to about 300 µm. The thickness of the panel support member 700 may be about 3 to 10 times the thickness of the display panel 400.

The panel support member 700 may include a lattice pattern 710, a first flat portion 720, and a second flat portion 730 (see, e.g., FIG. 8). The lattice pattern 710 may be disposed in the folding area FDA, the first flat portion 720 may be disposed in the first non-folding area NFA1, and the second flat portion 730 may be disposed in the second non-folding area NFA2.

The lattice pattern 710 may include a plurality of slits SLT defined by a plurality of bars BAR. Each of the slits SLT may be a hole (or opening) passing through (e.g., passing entirely through) the panel support member 700 in the third direction DR3.

Each of the slits SLT may extend in the first direction DR1. That is, each of the slits SLT may be longer in the first direction DR1 than in the second direction DR2. The lattice pattern 710 including the slits SLT may be more flexible. For example, the lattice pattern 710 may be stretched in the second direction DR2 when the display device 10 is folded.

Referring to FIG. 9, a plurality of slits SLT disposed in first through twelfth slit columns CS1 through CS12 and a plurality of bars BAR disposed in first through eleventh bar columns CB1 through CB11 are illustrated as an example of the lattice pattern 710.

The first through twelfth slit columns CS1 through CS12 and the first through eleventh bar columns CB1 through CB11 may be alternately disposed along the second direction DR2. For example, the first through twelfth slit columns CS1 through CS12 may be sequentially disposed along the second direction DR2, the first bar column CB1 may be disposed between the first slit column CS1 and the second slit column CS2, the second bar column CB2 may be disposed between the second slit column CS2 and the third slit column CS3, the third bar column CB3 may be disposed between the third slit column CS3 and the fourth slit column CS4, the fourth bar column CB4 may be disposed between the fourth slit column CS4 and the fifth slit column CS5, the fifth bar column CB5 may be disposed between the fifth slit column CS5 and the sixth slit column CS6, the sixth bar column CB6 may be disposed between the sixth slit column CS6 and the seventh slit column CS7, the seventh bar column CB7 may be disposed between the seventh slit column CS7 and the eighth slit column CS8, the eighth bar column CB8 may be disposed between the eighth slit column CS8 and the ninth slit column CS9, the ninth bar column CB9 may be disposed between the ninth slit column CS9 and the tenth slit column CS10, the tenth bar column CB10 may be disposed between the tenth slit column CS10 and the eleventh slit column CS11, and the eleventh bar column CB11 may be disposed between the eleventh slit column CS11 and the twelfth slit column CS12.

Each of the slits SLT disposed in the first slit column CS1 may be defined as a first slit SLT1, each of the slits SLT disposed in the second slit column CS2 may be defined as a second slit SLT2, and each of the slits SLT disposed in the third slit column CS3 may be defined as a third slit SLT3. Each of the slits SLT disposed in the fourth slit column CS4 may be defined as a fourth slit SLT4, each of the slits SLT disposed in the fifth slit column CS5 may be defined as a fifth slit SLT5, and each of the slits SLT disposed in the sixth slit column CS6 may be defined as a sixth slit SLT6. Each of the slits SLT disposed in the seventh slit column CS7 may be defined as a seventh slit SLT7, each of the slits SLT disposed in the eighth slit column CS8 may be defined as an eighth slit SLT8, and each of the slits SLT disposed in the ninth slit column CS9 may be defined as a ninth slit SLT9. Each of the slits SLT disposed in the tenth slit column CS10 may be defined as a tenth slit SLT10, each of the slits SLT disposed in the eleventh slit column CS11 may be defined as an eleventh slit SLT11, and each of the slits SLT disposed in the twelfth slit column CS12 may be defined as a twelfth slit SLT12.

The bars BAR may include first through eleventh vertical bars VBAR1 through VBAR11 and first through twelfth horizontal bars HBAR1 through HBAR12.

Each of the bars BAR disposed in the first bar column CB1 may be defined as the first vertical bar VBAR1, each of the bars BAR disposed in the second bar column CB2 may be defined as the second vertical bar VBAR2, and each of the bars BAR disposed in the third bar column CB3 may be defined as the third vertical bar VBAR3. Each of the bars BAR disposed in the fourth bar column CB4 may be defined as the fourth vertical bar VBAR4, each of the bars BAR disposed in the fifth bar column CB5 may be defined as the fifth vertical bar VBAR5, and each of the bars BAR disposed in the sixth bar column CB6 may be defined as the sixth vertical bar VBAR6. Each of the bars BAR disposed in the seventh bar column CB7 may be defined as the seventh vertical bar VBAR7, each of the bars BAR disposed in the eighth bar column CB8 may be defined as the eighth vertical bar VBAR8, and each of the bars BAR disposed in the ninth bar column CB9 may be defined as the ninth vertical bar VBAR9. Each of the bars BAR disposed in the tenth bar column CB10 may be defined as the tenth vertical bar VBAR10, and each of the bars BAR disposed in the eleventh bar column CB11 may be defined as the eleventh vertical bar VBAR11.

The first vertical bar VBAR1 may be disposed between the first slits SLT1 and the second slits SLT2, the second vertical bar VBAR2 may be disposed between the second slits SLT2 and the third slits SLT3, the third vertical bar VBAR3 may be disposed between the third slits SLT3 and the fourth slits SLT4, the fourth vertical bar VBAR4 may be disposed between the fourth slits SLT4 and the fifth slits SLT5, and the fifth vertical bar VBAR5 may be disposed between the fifth slits SLT5 and the sixth slits SLT6. The sixth vertical bar VBAR6 may be disposed between the sixth slits SLT6 and the seventh slits SLT7, the seventh vertical bar VBAR7 may be disposed between the seventh slits SLT7 and the eighth slits SLT8, the eighth vertical bar VBAR8 may be disposed between the eighth slits SLT8 and the ninth slits SLT9, the tenth vertical bar VBAR10 may be disposed between the tenth slits SLT10 and the eleventh slits SLT11, and the eleventh vertical bar VBAR11 may be disposed between the eleventh slits SLT11 and twelfth slits SLT12.

Each of the bars BAR disposed in the first slit column CS1 may be defined as the first horizontal bar HBAR1, each of the bars BAR disposed in the second slit column CS2 may be defined as the second horizontal bar HBAR2, and each of the bars BAR disposed in the third slit column CS3 may be defined as the third horizontal bar HBAR3. Each of the bars BAR disposed in the fourth slit column CS4 may be defined as the fourth horizontal bar HBAR4, each of the bars BAR disposed in the fifth slit column CS5 may be defined as the fifth horizontal bar HBAR5, and each of the bars BAR disposed in the sixth slit column CS6 may be defined as the sixth horizontal bar HBAR6. Each of the bars BAR disposed in the seventh slit column CS7 may be defined as the seventh horizontal bar HBAR7, each of the bars BAR disposed in the eighth slit column CS8 may be defined as the eighth horizontal bar HBAR8, and each of the bars BAR disposed in the ninth slit column CS9 may be defined as the ninth horizontal bar HBAR9. Each of the bars BAR disposed in the tenth slit column CS10 may be defined as the tenth horizontal bar HBAR10, each of the bars BAR disposed in the eleventh slit column CS11 may be defined as the eleventh horizontal bar HBAR11, and each of the bars BAR disposed in the twelfth slit column CS12 may be defined as the twelfth horizontal bar HBAR12.

The first horizontal bar HBAR1 may be disposed between the first slits SLT1 neighboring each other in the first direction DR1, the second horizontal bar HBAR2 may be disposed between the second slits SLT2 neighboring each other in the first direction DR1, and the third horizontal bar HBAR3 may be disposed between the third slits SLT3 neighboring each other in the first direction DR1. The fourth horizontal bar HBAR4 may be disposed between the fourth slits SLT4 neighboring each other in the first direction DR1, the fifth horizontal bar HBAR5 may be disposed between the fifth slits SLT5 neighboring each other in the first direction DR1, and the sixth horizontal bar HBAR6 may be disposed between the sixth slits SLT6 neighboring each other in the first direction DR1. The seventh horizontal bar HBAR7 may be disposed between the seventh slits SLT7 neighboring each other in the first direction DR1, the eighth horizontal bar HBAR8 may be disposed between the eighth slits SLT8 neighboring each other in the first direction DR1, and the ninth horizontal bar HBAR9 may be disposed between the ninth slits SLT9 neighboring each other in the first direction DR1. The tenth horizontal bar HBAR10 may be disposed between the tenth slits SLT10 neighboring each other in the first direction DR1, the eleventh horizontal bar HBAR11 may be disposed between the eleventh slits SLT11 neighboring each other in the first direction DR1, and the twelfth horizontal bar HBAR12 may be disposed between the twelfth slits SLT12 neighboring each other in the first direction DR1.

From among the first through twelfth slits SLT1 through SLT12, the even-numbered slits SLT2, SLT4, SLT6, SLT8, SLT10 and SLT12 may be shifted in the first direction DR1 compared with the odd-numbered slits SLT1, SLT3, SLT5, SLT7, SLT9 and SLT11. Therefore, lower halves of the odd-numbered slits SLT1, SLT3, SLT5, SLT7, SLT9 and SLT11 may overlap upper halves of the even-numbered slits SLT2, SLT4, SLT6, SLT8, SLT10 and SLT12 in the second direction DR2. In other embodiments, upper halves of the odd-numbered slits SLT1, SLT3, SLT5, SLT7, SLT9 and SLT11 may overlap lower halves of the even-numbered slits SLT2, SLT4, SLT6, SLT8, SLT10 and SLT12 in the second direction DR2.

In addition, the odd-numbered horizontal bars HBAR1, HBAR3, HBAR5, HBAR7, HBAR9 and HBAR11 may be disposed side-by-side in the second direction DR2, and the even-numbered horizontal bars HBAR2, HBAR4, HBAR6, HBAR8, HBAR10 and HBAR12 may be disposed side-by-side in the second direction DR2. Further, the second horizontal bars HBAR2 may be disposed between the first slits SLT1 and the third slits SLT3, the third horizontal bars HBAR3 may be disposed between the second slits SLT2 and the fourth slits SLT4, the fourth horizontal bars HBAR4 may be disposed between the third slits SLT3 and the fifth slits SLT5, the fifth horizontal bars HBAR5 may be disposed between the fourth slits SLT4 and the sixth slits SLT6, the sixth horizontal bars HBAR6 may be disposed between the fifth slits SLT5 and the seventh slits SLT7, the seventh horizontal bars HBAR7 may be disposed between the sixth slits SLT6 and the eighth slits SLT8, the eighth horizontal bars HBAR8 may be disposed between the seventh slits SLT7 and the ninth slits SLT9, the ninth horizontal bars HBAR9 may be disposed between the eighth slits SLT8 and the tenth slits SLT10, the tenth horizontal bars HBAR10 may be disposed between the ninth slits SLT9 and the eleventh slits SLT11, and the eleventh horizontal bars HBAR11 may be disposed between the tenth slits SLT10 and the twelfth slits SLT12.

In some embodiments, a width of each of the slits SLT may be smaller than a width of each of the bars BAR. For example, the width of each of the slits SLT may be in a range of about 10 μm to about 100 μm, and the width of each of the bars BAR may be in a range of about 30 μm to about 150 μm.

A front surface of each of the first flat portion 720 and the second flat portion 730 may be flat. The first flat portion 720 and the second flat portion 730 may be located opposite each other with the lattice pattern 710 interposed between them. In some embodiments, a height (or thickness) of each of the bars BAR may be lower than a height of the first flat portion 720 and a height of the second flat portion 730.

The through-hole STH passing through the panel support member 700 may be disposed in the first flat portion 720. The through-hole STH may be disposed adjacent to an edge (e.g., an outer edge) of the first flat portion 720.

In the following embodiments, the first vertical bar VBAR1 and the eleventh vertical bar VBAR11 are described as being disposed at edges of the folding area FDA, and the sixth vertical bar VBAR6 is described as being disposed in a central area of the folding area FDA as an example.

Referring to FIGS. 10 and 11, in some embodiments, a height of a bar BAR disposed at an edge of the folding area FDA from among the bars BAR may be higher than a height of a bar BAR disposed in the central area of the folding area FDA from among the bars BAR. The heights of the bars BAR may decrease from the edges of the folding area FDA toward the central area of the folding area FDA. For example, a height VBAR1_H of the first vertical bar VBAR1 disposed at an edge of the folding area FDA may be higher than a height VBAR6_H of the sixth vertical bar VBAR6 disposed in the central area of the folding area FDA. In addition, the heights of the bars BAR may decrease in the order of the first through sixth vertical bars VBAR1 through VBAR6 and may increase in the order of the sixth through eleventh vertical bars VBAR6 through VBAR11.

In some embodiments, a width of a slit SLT disposed at an edge of the folding area FDA from among the slits SLT may be smaller than a width of a slit SLT disposed in the central area of the folding area FDA from among the slits SLT. The widths of the slits SLT may increase from the edges of the folding area FDA toward the central area of the folding area FDA. For example, a width SLT1_W of the first slit SLT1 disposed at an edge of the folding area FDA may be smaller than a width SLT6_W of the sixth slit SLT6 and a width SLT7_W of the seventh slit SLT7 disposed in the central area of the folding area FDA. In addition, the widths of the slits SLT may increase in the order of the first through sixth slits SLT1 through SLT6 and may decrease in the order of the seventh through twelfth slits SLT7 through SLT12. However, the bars BAR may have a constant width. For example, a width VBAR1_W of the first vertical bar VBAR1 and a width VBAR2_W of the second vertical bar VBAR2 may be the same.

In some embodiments, a bar BAR disposed at an edge of the folding area FDA may include all of the first layer L1, the second layer L2 and the third layer L3, and a bar BAR disposed in the central area of the folding area FDA may not include at least any one of the first layer L1, the second layer L2 and the third layer L3. The number of types of layers included in the bar BAR disposed at the edge of the folding area FDA from among the first layer L1, the second layer L2, and the third layer L3 may be greater than the number of types of layers included in the bar BAR disposed in the central area of the folding area FDA from among the first layer L1, the second layer L2, and the third layer L3. For example, while the first vertical bar VBAR1 disposed at an edge of the folding area FDA includes all of the first layer L1, the second layer L2, and the third layer L3, the sixth vertical bar VBAR6 disposed in the central area of the folding area FDA may include only the third layer L3.

The base resin RSN may include filling portions FPT and coating portions CPT. Each of the filling portions FPT refers to a portion of the base resin RSN disposed inside and on a slit SLT and located in an area overlapping the slit SLT in the third direction DR3. Each of the coating portions CPT refers to a portion of the base resin RSN disposed on a vertical var VBAR and located in an area overlapping the vertical bar VBAR in the third direction DR3.

For example, the base resin RSN may include a first filling portion FPT1 disposed inside and on the first slit SLT1 and located in an area overlapping the first slit SLT1 in the third direction DR3 and a second filling portion FPT2 disposed inside and on the second slit SLT2 and located in an area overlapping the second slit SLT2 in the third direction DR3. In addition, the base resin RSN may include a first coating portion CPT1 disposed on the first vertical bar VBAR1 and located in an area overlapping the first vertical bar VBAR1 in the third direction DR3 and a second coating portion CPT2 disposed on the second vertical bar VBAR2 and located in an area overlapping the second vertical bar VBAR2 in the third direction DR3.

In some embodiments, the volume of each filling portion FPT and the volume of a coating portion CPT disposed on one side of the filling portion FPT may be the same. For example, the volume of the first filling portion FPT1 and the volume of the first coating portion CPT1 disposed on one side of the first filling portion FPT1 may be the same, and the volume of the second filling portion FPT2 and the volume of the second coating portion CPT2 disposed on one side of the second filling portion FPT2 may be the same. In the display device 10 according to the illustrated embodiment, because the volume of each filling portion FPT and the volume of a coating portion CPT disposed on one side of the filling portion FPT are the same, the same amount of the base resin RSN may be disposed in an area overlapping each slit SLT and an area overlapping each bar BAR. Accordingly, it is possible to reduce or minimize unevenness of the lattice pattern 710, thereby making an upper surface of the base resin RSN flat (or flatter).

In some embodiments, widths of the filling portions FPT may increase from the edges of the folding area FDA toward the central area of the folding area FDA. For example, because the width SLT1_W of the first slit SLT1 is smaller than a width SLT2_W of the second slit SLT2, a width of the first filling portion FPT1 may be smaller than a width of the second filling portion FPT2. The coating portions CPT, however, may have a constant width. For example, because the width VBAR1_W of the first vertical bar VBAR1 and the width VBAR2_W of the second vertical bar VBAR2 are the same, a width of the first coating portion CPT1 and a width of the second coating portion CPT2 may be the same.

Heights of the coating portions CPT may increase from the edges of the folding area FDA toward the central area of the folding area FDA. For example, a height CPT1_H of the first coating portion CPT1 may be smaller than a height CPT2_H of the second coating portion CPT2.

Accordingly, from the edges of the folding area FDA toward the central area of the folding area FDA, the volumes of the filling portions FPT may increase, and the volumes of the coating portions CPT may increase. When the base resin RSN is thermally cured, the base resin RSN in the folding area FDA may be affected by the contraction of the base resin RSN located on the first flat portion 720 and the second flat portion 730. Therefore, the base resin RSN in an edge area of the folding area FDA may contract more than the base resin RSN in the central area of the folding area FDA. As a result, the upper surface of the base resin RSN may not be flat. However, in the display device 10 according to the illustrated embodiment, because the volumes of the filling portions FPT and the coating portions CPT are smaller at the edges of the folding area FDA than in the central area of the folding area FDA, contraction of the base resin RSN located on the first flat portion 720 and the second flat portion 730 may be reduced or minimized. Thus, the upper surface of the base resin RSN can be formed flat (or flatter).

In addition, the stress applied to the central area of the folding area FDA during folding of the display device 10 may be greater than the stress applied to the edges of the folding area FDA. In the display device 10 according to the illustrated embodiment, more base resin RSN is disposed in the central area of the folding area FDA because the volumes of the filling portions FPT and the coating portions CPT are greater in the central area of the folding area FDA than at the edges of the folding area FDA. Therefore, the stress applied during folding can be reduced or minimized.

Hereinafter, other embodiments of the display device 10 will be described. In the following embodiments, the same or substantially similar elements as those of the above-described embodiment will be indicated by the same reference numerals, and their redundant description will be omitted or given briefly, while differences therebetween will be primarily described.

Figure 12:
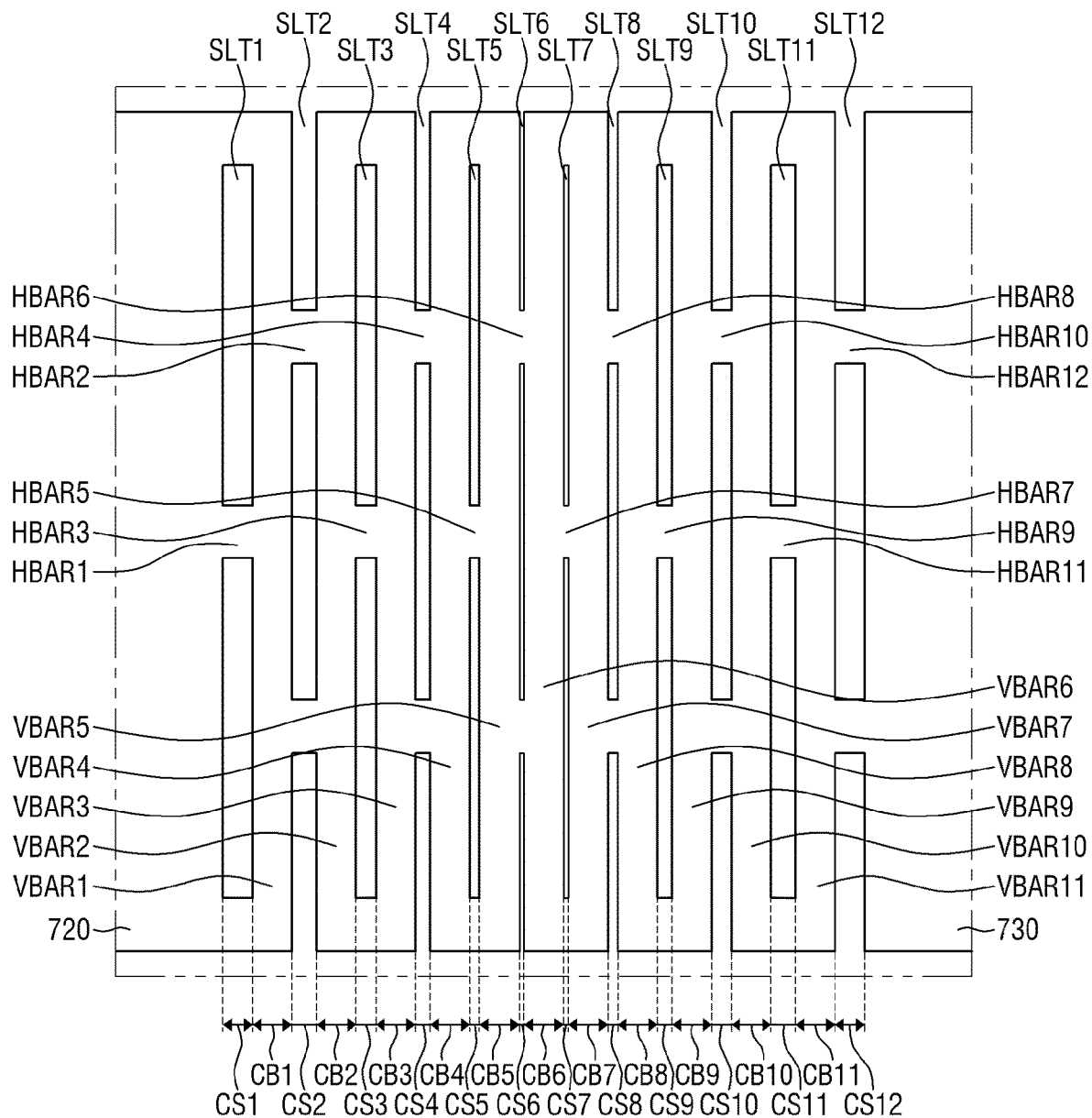
FIG. 12 is an enlarged view of the portion X1 of FIG. 8 according to another embodiment.
Figure 13:
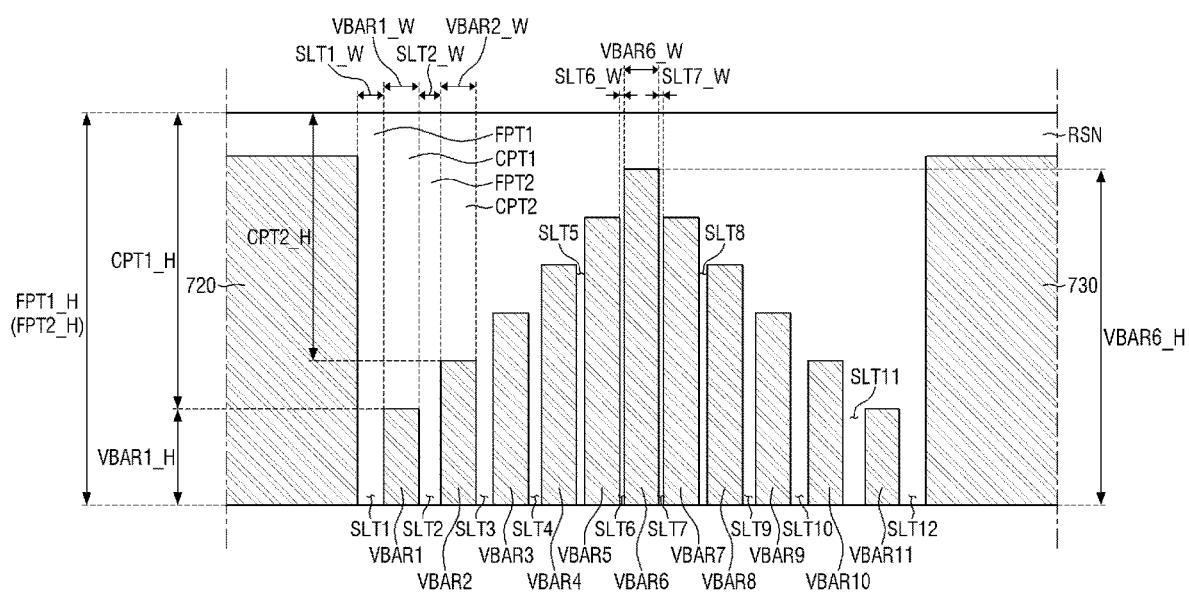
FIG. 13 is a cross-sectional view schematically illustrating the panel support member and a base resin according to the embodiment shown in FIG. 12.

FIG. 12 is an enlarged view of the portion X1 of FIG. 8 according to another embodiment. FIG. 13 is a cross-sectional view schematically illustrating the panel support member and a base resin RSN according to another embodiment.

Referring to FIGS. 12 and 13, a display device 10 according to the illustrated embodiment differs from the display device 10 described with reference to FIGS. 8 through 11 in that heights of a plurality of bars BAR increase from edges of a folding area FDA toward a central area of the folding area FDA.

More specifically, a height of a bar BAR disposed at an edge of the folding area FDA from among the bars BAR may be lower than a height of a bar BAR disposed in the central area of the folding area FDA from among the bars BAR. The heights of the bars BAR may increase from the edges of the folding area FDA toward the central area of the folding area FDA. For example, a height VBAR1_H of a first vertical bar VBAR1 disposed at an edge of the folding area FDA may be lower than a height VBAR6_H of a sixth vertical bar VBAR6 disposed in the central area of the folding area FDA. In addition, the heights of the bars BAR may increase in the order of first through sixth vertical bars VBAR1 through VBAR6 and may decrease in the order of sixth through eleventh vertical bars VBAR6 through VBAR11.

In some embodiments, a width of a slit SLT disposed at an edge of the folding area FDA from among a plurality of slits SLT may be greater than a width of a slit SLT disposed in the central area of the folding area FDA from among the slits SLT. The widths of the slits SLT may decrease from the edges of the folding area FDA toward the central area of the folding area FDA. For example, a width SLT1_W of a first slit SLT1 disposed at an edge of the folding area FDA may be greater than a width SLT6_W of a sixth slit SLT6 and a width SLT7_W of a seventh slit SLT7 disposed in the central area of the folding area FDA. In addition, the widths of the slits SLT may decrease in the order of first through sixth slits SLT1 through SLT6 and may increase in the order of seventh through twelfth slits SLT7 through SLT12. The bars BAR, however, may have a constant width as in the above-described embodiment. For example, a width VBAR1_W of the first vertical bar VBAR1 and a width VBAR2_W of the second vertical bar VBAR2 may be the same.

In some embodiments, a bar BAR disposed in the central area of the folding area FDA may include all of a first layer L1, a second layer L2, and a third layer L3, and a bar BAR disposed at an edge of the folding area FDA may not include at least any one of the first layer L1, the second layer L2, and the third layer L3. The number of types of layers included in the bar BAR disposed in the central area of the folding area FDA from among the first layer L1, the second layer L2, and the third layer L3 may be greater than the number of types of layers included in the bar BAR disposed at the edge of the folding area FDA from among the first layer L1, the second layer L2, and the third layer L3. For example, while the sixth vertical bar VBAR6 disposed in the central area of the folding area FDA includes all of the first layer L1, the second layer L2, and the third layer L3, the first vertical bar VBAR1 disposed at an edge of the folding area FDA may include only the third layer L3.

As in the above-described embodiment, in the illustrated embodiment, the volume of each filling portion FPT and the volume of a coating portion CPT disposed on one side of the filling portion FPT may be the same. For example, the volume of a first filling portion FPT1 and the volume of a first coating portion CPT1 disposed on one side of the first filling portion FPT1 may be the same, and the volume of a second filling portion FPT2 and the volume of a second coating portion CPT2 disposed on one side of the second filling portion FPT2 may be the same. In the display device 10 according to the illustrated embodiment, because the volume of each filling portion FPT and the volume of a coating portion CPT disposed on one side of the filling portion FPT are the same, the same amount of the base resin RSN may be disposed in an area overlapping each slit SLT and an area overlapping each bar BAR. Accordingly, it is possible to reduce or minimize unevenness of a lattice pattern 710, thereby making an upper surface of the base resin RSN flat (or flatter).

In some embodiments, widths of the filling portions FPT may decrease from the edges of the folding area FDA toward the central area of the folding area FDA. For example, because the width SLT1_W of the first slit SLT1 is greater than a width SLT2_W of the second slit SLT2, a width of the first filling portion FPT1 may be greater than a width of the second filling portion FPT2. However, the coating portions CPT may have a constant width. For example, because the width VBAR1_W of the first vertical bar VBAR1 and the width VBAR2_W of the second vertical bar VBAR2 are the same, a width of the first coating portion CPT1 and a width of the second coating portion CPT2 may be the same.

Heights of the coating portions CPT may decrease from the edges of the folding area FDA toward the central area of the folding area FDA. For example, a height CPT1_H of the first coating portion CPT1 may be greater than a height CPT2_H of the second coating portion CPT2.

The stress applied to the central area of the folding area FDA during folding of the display device 10 may be greater than the stress applied to the edges of the folding area FDA. In the display device 10 according to the illustrated embodiment, because the widths and volumes of the bars BAR increase from the edges of the folding area FDA toward the central area of the folding area FDA, the stress applied during folding can be reduced or minimized.

Figure 14:
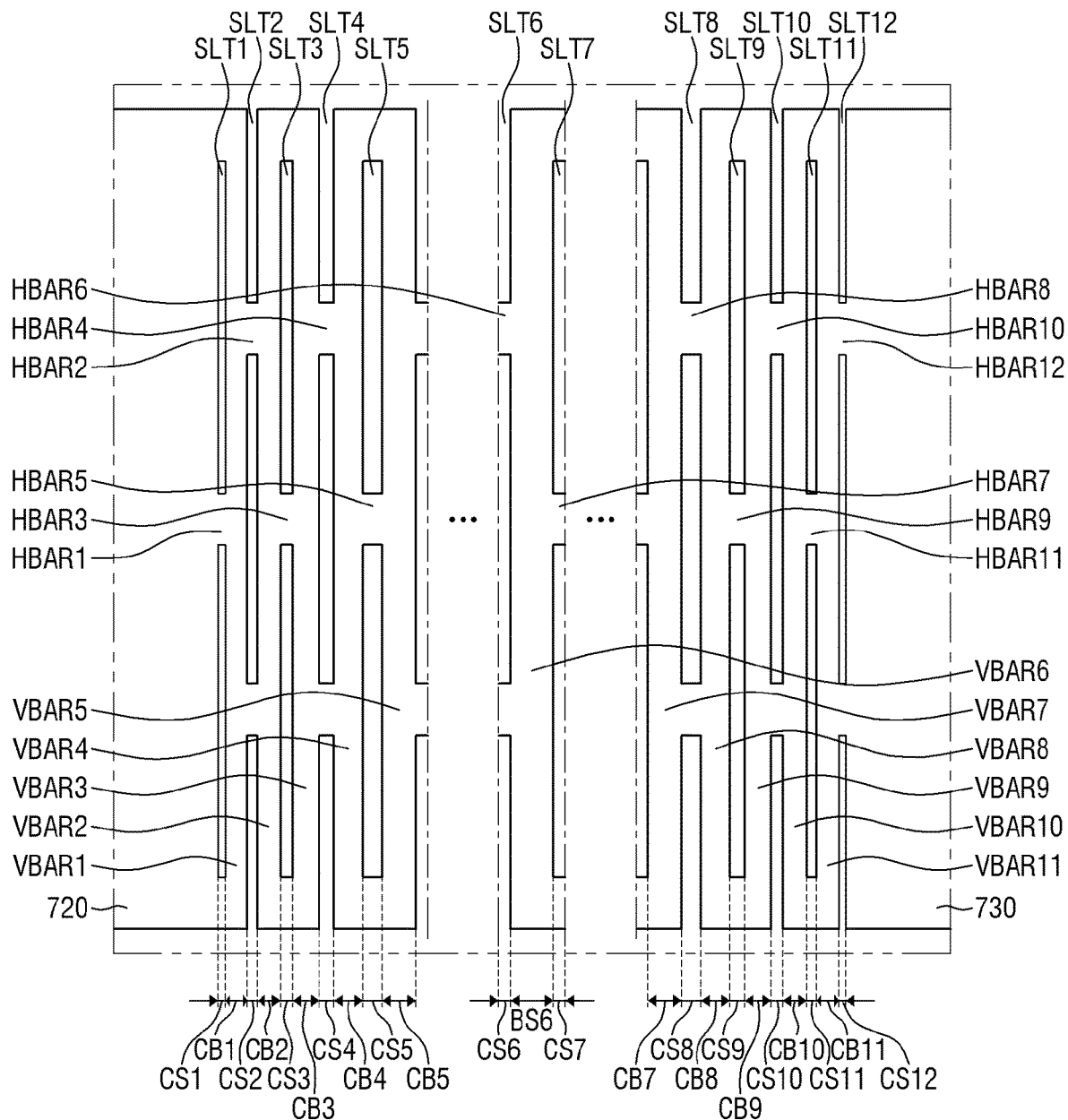
FIG. 14 is an enlarged view of the portion X1 of FIG. 8 according to another embodiment.
Figure 15:
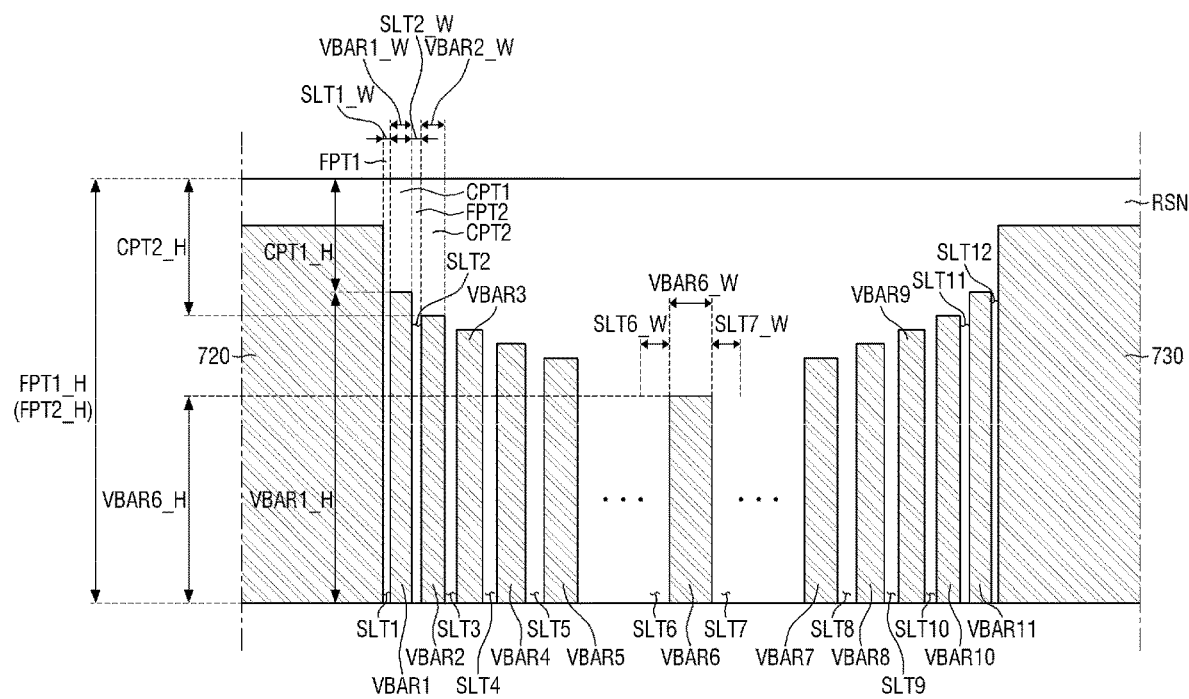
FIG. 15 is a cross-sectional view schematically illustrating the panel support member and a base resin according to the embodiment shown in FIG. 14.

FIG. 14 is an enlarged view of the portion X1 of FIG. 8 according to another embodiment. FIG. 15 is a cross-sectional view schematically illustrating the panel support member and a base resin RSN according to another embodiment.

Referring to FIGS. 14 and 15, a display device 10 according to the illustrated embodiment differs from the display device 10 according to the embodiment described with reference to FIGS. 8 through 11 in that widths of a plurality of bars BAR increase from edges of a folding area FDA toward a central area of the folding area FDA.

More specifically, a width of a bar BAR disposed at an edge of the folding area FDA from among the bars BAR may be smaller than a width of a bar BAR disposed in the central area of the folding area FDA from among the bars BAR. The widths of the bars BAR may increase from the edges of the folding area FDA toward the central area of the folding area FDA. For example, a width VBAR1_W of a first vertical bar VBAR1 disposed at an edge of the folding area FDA may be smaller than a width VBAR6_W of a sixth vertical bar VBAR6 disposed in the central area of the folding area FDA. In addition, the widths of the bars BAR may increase in the order of first through sixth vertical bars VBAR1 through VBAR6 and may decrease in the order of sixth through eleventh vertical bars VBAR6 through VBAR11.

Widths of coating portions CPT may increase from the edges of the folding area FDA toward the central area of the folding area FDA. For example, because the width VBAR1_W of the first vertical bar VBAR1 is smaller than a width VBAR2_W of the second vertical bar VBAR2, a width of a first coating portion CPT1 may be smaller than a width of a second coating portion CPT2.

As in the above-described embodiments, in the illustrated embodiment, the volume of each filling portion FPT and the volume of a coating portion CPT disposed on one side of the filling portion FPT may be the same. For example, the volume of a first filling portion FPT1 and the volume of the first coating portion CPT1 disposed on one side of the first filling portion FPT1 may be the same, and the volume of a second filling portion FPT2 and the volume of the second coating portion CPT2 disposed on one side of the second filling portion FPT2 may be the same. In the display device 10 according to the illustrated embodiment, because the volume of each filling portion FPT and the volume of a coating portion CPT disposed on one side of the filling portion FPT are the same, the same amount of the base resin RSN may be disposed in an area overlapping each slit SLT and an area overlapping each bar BAR. Accordingly, it is possible to reduce or minimize unevenness of a lattice pattern 710, thereby making an upper surface of the base resin RSN flat (or flatter).

As in the embodiment described with reference to FIGS. 8 through 11, from the edges of the folding area FDA toward the central area of the folding area FDA, the volumes of the filling portions FPT may increase, and the volumes of the coating portions CPT may increase. When the base resin RSN is thermally cured, the base resin RSN in the folding area FDA may be affected by the contraction of the base resin RSN located on a first flat portion 720 and a second flat portion 730. Therefore, the base resin RSN in an edge area of the folding area FDA may contract more than the base resin RSN in the central area of the folding area FDA. As a result, the upper surface of the base resin RSN may not be flat. However, in the display device 10 according to the illustrated embodiment, because the volumes of the filling portions FPT and the coating portions CPT are smaller at the edges of the folding area FDA than in the central area of the folding area FDA, contraction of the base resin RSN located on the first flat portion 720 and the second flat portion 730 may be reduced or minimized. Thus, the upper surface of the base resin RSN can be formed flat (or flatter).

In addition, the stress applied to the central area of the folding area FDA during folding of the display device 10 may be greater than the stress applied to the edges of the folding area FDA. In the display device 10 according to the illustrated embodiment, more base resin RSN is disposed in the central area of the folding area FDA because the volumes of the filling portions FPT and the coating portions CPT are greater in the central area of the folding area FDA than at the edges of the folding area FDA. Therefore, the stress applied during folding can be reduced or minimized.

Figure 16:
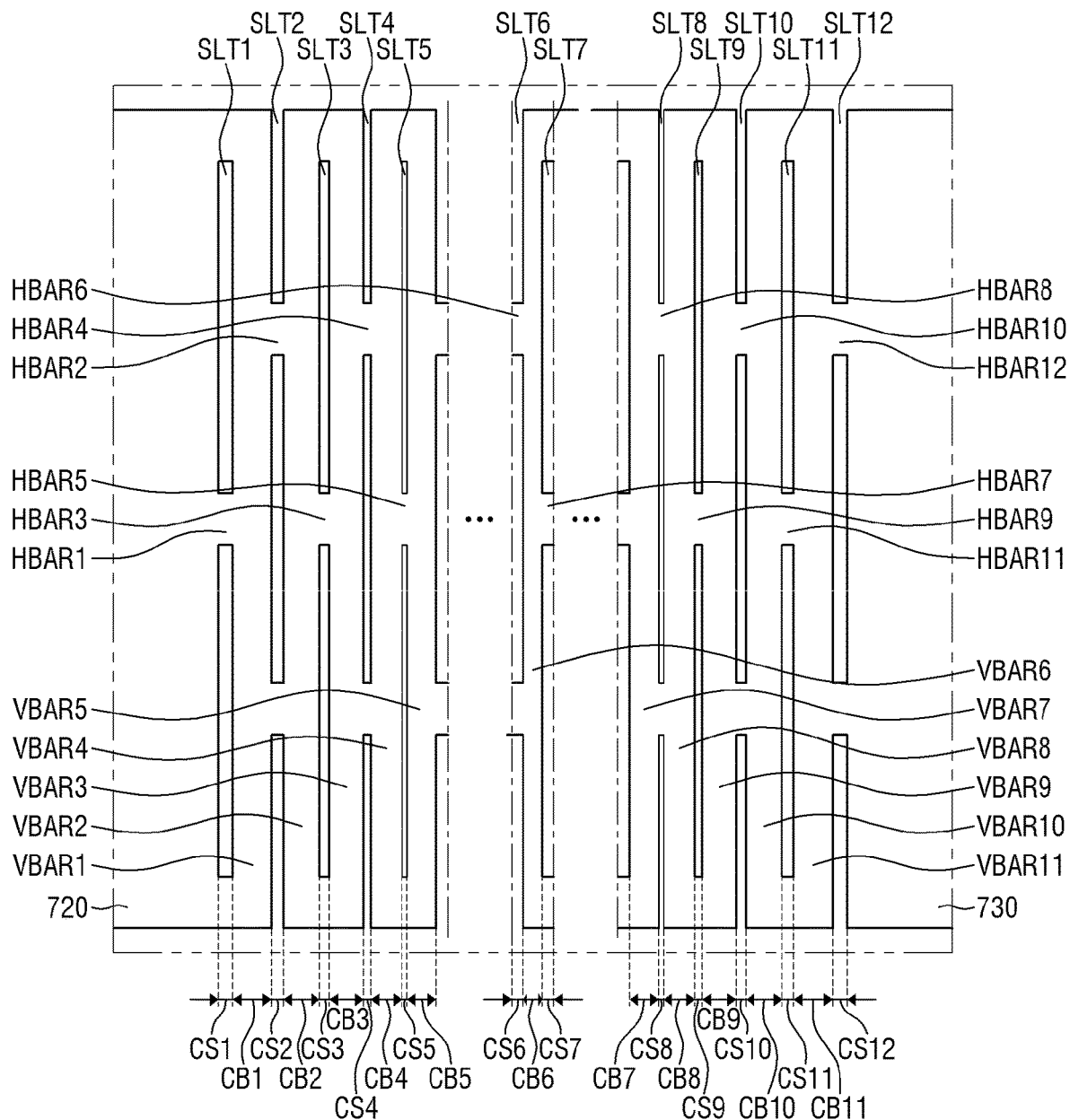
FIG. 16 is an enlarged view of the portion X1 of FIG. 8 according to another embodiment.
Figure 17:
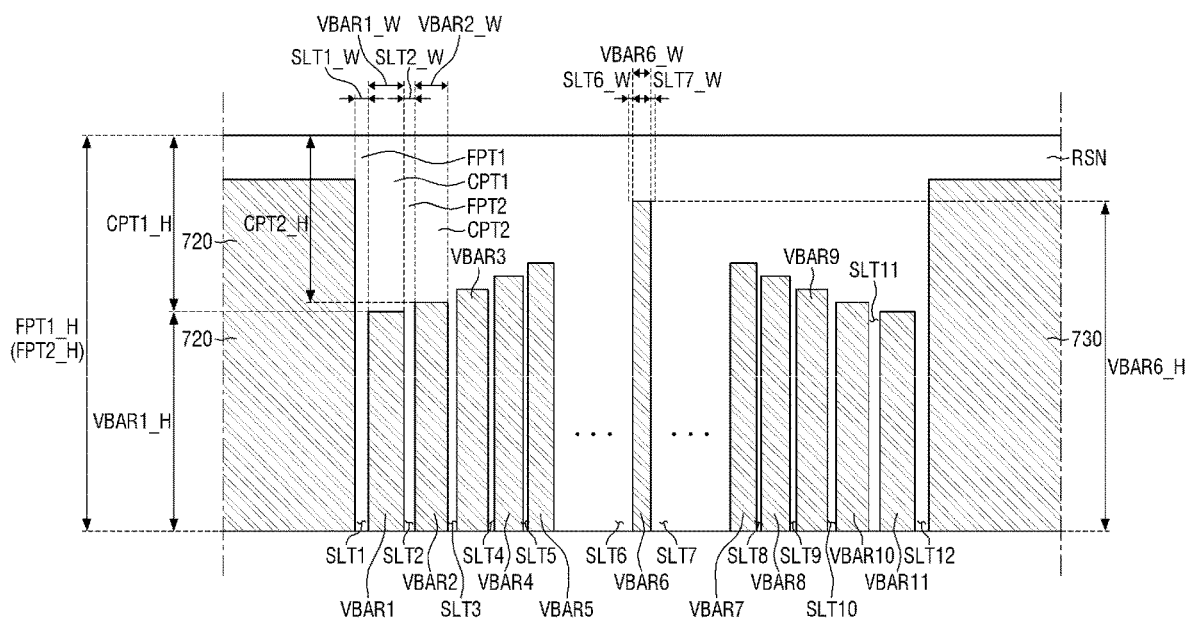
FIG. 17 is a cross-sectional view schematically illustrating the panel support member and a base resin according to the embodiment shown in FIG. 16.

FIG. 16 is an enlarged view of the portion X1 of FIG. 8 according to another embodiment. FIG. 17 is a cross-sectional view schematically illustrating the panel support member and a base resin RSN according to another embodiment.

Referring to FIGS. 16 and 17, a display device 10 according to the illustrated embodiment differs from the display device 10 according to the embodiment described with reference to FIGS. 12 and 13 in that widths of a plurality of bars BAR decrease from edges of a folding area FDA toward a central area of the folding area FDA.

More specifically, a width of a bar BAR disposed at an edge of the folding area FDA from among the bars BAR may be greater than a width of a bar BAR disposed in the central area of the folding area FDA from among the bars BAR. The widths of the bars BAR may decrease from the edges of the folding area FDA toward the central area of the folding area FDA. For example, a width VBAR1_W of a first vertical bar VBAR1 disposed at an edge of the folding area FDA may be greater than a width VBAR6_W of a sixth vertical bar VBAR6 disposed in the central area of the folding area FDA. In addition, the widths of the bars BAR may decrease in the order of first through sixth vertical bars VBAR1 through VBAR6 and may increase in the order of sixth through eleventh vertical bars VBAR6 through VBAR11.

Widths of coating portions CPT may decrease from the edges of the folding area FDA toward the central area of the folding area FDA. For example, because the width VBAR1_W of the first vertical bar VBAR1 is greater than a width VBAR2_W of the second vertical bar VBAR2, a width of a first coating portion CPT1 may be greater than a width of a second coating portion CPT2.

As in the above-described embodiments, in the illustrated embodiment, the volume of each filling portion FPT and the volume of a coating portion CPT disposed on one side of the filling portion FPT may be the same. For example, the volume of a first filling portion FPT1 and the volume of the first coating portion CPT1 disposed on one side of the first filling portion FPT1 may be the same, and the volume of a second filling portion FPT2 and the volume of the second coating portion CPT2 disposed on one side of the second filling portion FPT2 may be the same. In the display device 10 according to the illustrated embodiment, because the volume of each filling portion FPT and the volume of a coating portion CPT disposed on one side of the filling portion FPT are the same, the same amount of the base resin RSN may be disposed in an area overlapping each slit SLT and an area overlapping each bar BAR. Accordingly, it is possible to reduce or minimize unevenness of a lattice pattern 710, thereby making an upper surface of the base resin RSN flat (or flatter).

Figure 18:
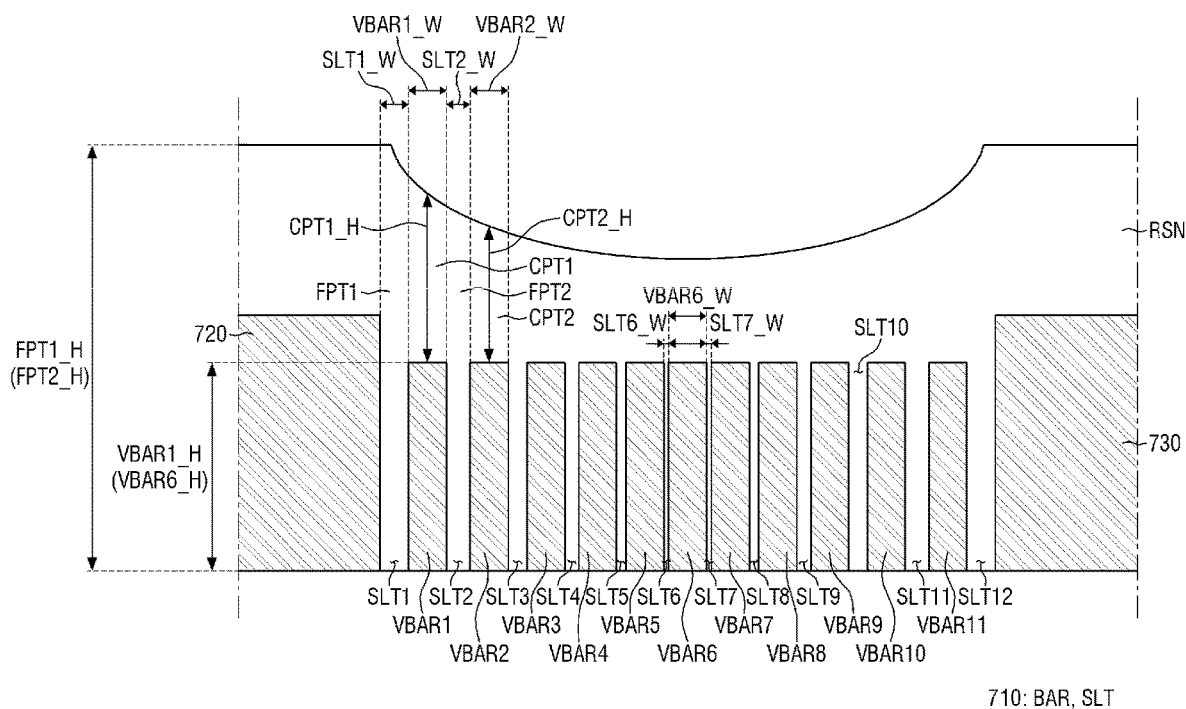
FIG. 18 is a cross-sectional view schematically illustrating a panel support member and a base resin before the base resin is cured according to an embodiment.
Figure 19:
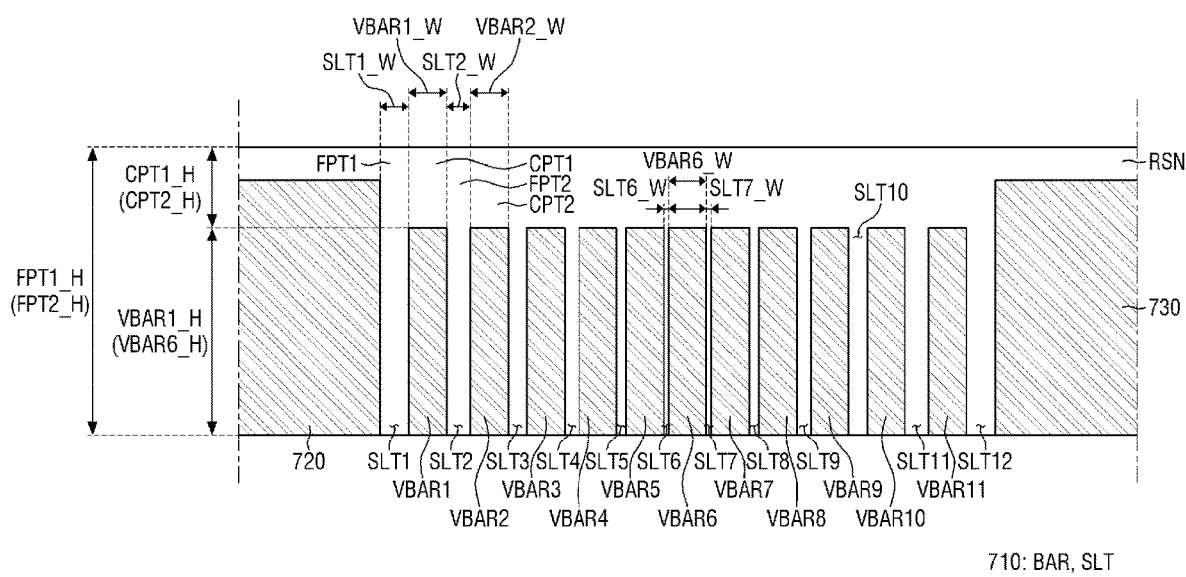
FIG. 19 is a cross-sectional view schematically illustrating the panel support member and the base resin shown in FIG. 18 after the base resin is cured.

FIG. 18 is a cross-sectional view schematically illustrating a panel support member 700 and a base resin RSN according to an embodiment before the base resin RSN is cured. FIG. 19 is a cross-sectional view schematically illustrating the panel support member 700 and the base resin RSN shown in FIG. 18 after the base resin RSN is cured.

Referring to FIGS. 18 and 19, a display device 10 according to the illustrated embodiment differs from the display devices 10 according to the above-described embodiments in that a plurality of bars BAR have a constant height.

More specifically, as illustrated in FIG. 18, an upper surface of the base resin RSN in an area overlapping a lattice pattern 710 may be concave toward the panel support member 700 before thermal curing.

Different from the above-described embodiments, in the illustrated embodiment, the bars BAR may have a constant height. For example, first through eleventh vertical bars VBAR1 through VBAR11 may have the same height.

In some embodiments, a width of a slit SLT disposed at an edge of a folding area FDA from among a plurality of slits SLT may be greater than a width of a slit SLT disposed in a central area of the folding area FDA from among the slits SLT. The widths of the slits SLT may decrease from the edges of the folding area FDA toward the central area of the folding area FDA. For example, a width SLT1_W of a first slit SLT1 disposed at an edge of the folding area FDA may be greater than a width SLT6_W of a sixth slit SLT6 and a width SLT7_W of a seventh slit SLT7 disposed in the central area of the folding area FDA. In addition, the widths of the slits SLT may decrease in the order of first through sixth slits SLT1 through SLT6 and may increase in the order of seventh through twelfth slits SLT7 through SLT12. However, the bars BAR may have a constant width. For example, a width VBAR1_W of the first vertical bar VBAR1 and a width VBAR2_W of the second vertical bar VBAR2 may be the same.

The illustrated embodiment is the same as the embodiment described with reference to FIGS. 12 and 13 in that the widths of the slits SLT decrease from the edges of the folding area FDA toward the central area of the folding area FDA but differs therefrom in that the bars BAR have a constant height.

In the illustrated embodiment, the volume of each filling portion FPT and the volume of a coating portion CPT disposed on one side of the filling portion FPT may be the same before the base resin RSN is thermally cured. For example, before the base resin RSN is thermally cured, the volume of a first filling portion FPT1 and the volume of a first coating portion CPT1 disposed on one side of the first filling portion FPT1 may be the same, and the volume of a second filling portion FPT2 and the volume of a second coating portion CPT2 disposed on one side of the second filling portion FPT2 may be the same. In the display device 10 according to the illustrated embodiment, because the volume of each filling portion FPT and the volume of a coating portion CPT disposed on one side of the filling portion FPT are the same before the base resin RSN is thermally cured, the same amount of the base resin RSN may be disposed in an area overlapping each slit SLT and an area overlapping each bar BAR. Accordingly, it is possible to reduce or minimize unevenness of the lattice pattern 710 after the base resin RSN is thermally cured, thereby making the upper surface of the base resin RSN flat (or flatter), as illustrated in FIG. 19.

In the illustrated embodiment, the upper surface of the base resin RSN is concave before the base resin RSN is thermally cured. Therefore, widths of the filling portions FPT may decrease from the edges of the folding area FDA toward the central area of the folding area FDA. For example, because the width SLT1_W of the first slit SLT1 is greater than a width SLT2_W of the second slit SLT2, a width of the first filling portion FPT1 may be greater than a width of the second filling portion FPT2. The coating portions CPT, however, may have a constant width as in the above-described embodiments. For example, because the width VBAR1_W of the first vertical bar VBAR1 and the width VBAR2_W of the second vertical bar VBAR2 are the same, a width of the first coating portion CPT1 and a width of the second coating portion CPT2 may be the same.

Before the base resin RSN is thermally cured, heights of the coating portions CPT may decrease from the edges of the folding area FDA toward the central area of the folding area FDA. For example, a height CPT1_H of the first coating portion CPT1 may be greater than a height CPT2_H of the second coating portion CPT2.

Because the bars BAR have the same height, the upper surface of the base resin RSN before thermal curing may be concave so that the volumes of the filling portions FPT and the coating portions CPT decrease from the edges of the folding area FDA toward the central area of the folding area FDA. The volumes of a filling portion FPT and a coating portion CPT located at an edge of the folding area FDA may be relatively greater than the volumes of a filling portion FPT and a coating portion CPT located in the central area of the folding area FDA. Because the degree of contraction of the base resin RSN due to thermal curing increases as the volume of the base resin RSN increases, a filling portion FPT and a coating portion CPT located at an edge of the folding area FDA may contract more than a filling portion FPT and a coating portion CPT located in the central area of the folding area FDA. Accordingly, the upper surface of the base resin RSN after thermal curing may be flat, as illustrated in FIG. 19.

In a display device according to an embodiment of the present disclosure, an upper surface of a base resin may be flat.

In a display device according to an embodiment of the present disclosure, stress applied to a panel support member can be reduced or minimized.

However, the aspects and features of the present disclosure are not limited to those described herein. The above and other aspects and features of the present disclosure will become more apparent to one of ordinary skill in the art to which the present disclosure pertains by referencing the claims.

In concluding the detailed description, those skilled in the art will appreciate that many variations and modifications can be made to the embodiments described herein without substantially departing from the present disclosure. Therefore, the described embodiments of the present disclosure are used in a generic and descriptive sense and not for purposes of limitation.

What is claimed is:

1. A display device comprising:
a display panel having a folding area, a first non-folding area on a side of the folding area, and a second non-folding area on another side of the folding area;
a support member on a surface of the display panel and having a plurality of slits in the folding area and a plurality of bars between the slits; and
a base resin on the support member and inside the support member,
wherein a height of a first one of the bars at an edge of the folding area from among the bars is higher than a height of a second one of the bars in a central area of the folding area from among the bars,
wherein a width of a first one of the slits at the edge of the folding area from among the slits is smaller than a width of a second one of the slits in the central area of the folding area from among the slits, and
wherein the support member includes a first fiber material extending in a second direction and a second fiber material extending in a first direction different from the second direction.

2. The display device of claim 1, wherein heights of the bars decrease from the edge of the folding area toward the central area of the folding area, and
wherein widths of the slits increase from the edge of the folding area toward the central area of the folding area.

3. The display device of claim 1, wherein a width of the first one of the bars at the edge of the folding area is smaller than a width of the second one of the bars in the central area of the folding area.

4. The display device of claim 3, wherein widths of the bars increase from the edge of the folding area toward the central area of the folding area.

5. The display device of claim 1, wherein the first fiber material includes a first fiber yarn and the second fiber material includes a second fiber yarn and the support member comprises:
a first layer comprising the first fiber yarn extending in the second direction, wherein the second direction crosses the first direction;
a second layer comprising the second fiber yarn extending in the first direction; and
a third layer comprising a third fiber yarn extending in the second direction,
wherein the first one of the bars at the edge of the folding area comprises all of the first layer, the second layer, and the third layer, and
wherein the second one of the bars in the central area of the folding area does not comprise at least one of the first layer, the second layer, and the third layer.

6. The display device of claim 5, wherein a number of types of layers in the first one of the bars at the edge of the folding area from among the first layer, the second layer, and the third layer is greater than a number of types of layers in the second one of the bars in the central area of the folding area from among the first layer, the second layer, and the third layer.

7. The display device of claim 1, wherein the support member is a metal plate comprising a metal material.

8. The display device of claim 1, wherein an upper surface of the base resin is flat.

9. The display device of claim 1, wherein the width of each of the slits is smaller than the width of each of the bars.

10. The display device of claim 1, wherein the support member has a first flat portion and a second flat portion in the first non-folding area and the second non-folding area, respectively, and
wherein the height of each of the bars is smaller than a height of the first flat portion and a height of the second flat portion.

11. A display device comprising:
a display panel having a folding area, a first non-folding area on a side of the folding area, and a second non-folding area on another side of the folding area;
a support member on a surface of the display panel and having a plurality of slits in the folding area and a plurality of bars between the slits; and
a base resin on the support member and inside the support member,
wherein a height of a first one of the bars at an edge of the folding area from among the bars is lower than a height of a second one of the bars in a central area of the folding area from among the bars,
wherein a width of a first one of the slits at the edge of the folding area from among the slits is greater than a width of a second one of the slits in the central area of the folding area from among the slits,
wherein the support member includes a first fiber material extending in a second direction and a second fiber material extending in a first direction different from the second direction.

12. The display device of claim 11, wherein heights of the bars increase from the edge of the folding area toward the central area of the folding area, and
wherein widths of the slits decrease from the edge of the folding area toward the central area of the folding area.

13. The display device of claim 11, wherein a width of the first one of the bars at the edge of the folding area is greater than a width of the second of the bars in the central area of the folding area.

14. The display device of claim 13, wherein widths of the bars decrease from the edge of the folding area toward the central area of the folding area.

15. The display device of claim 11, wherein the first fiber material includes a first fiber yarn and the second fiber material includes a second fiber yarn and the support member comprises:
a first layer comprising the first fiber yarn extending in the second direction, wherein the second direction crosses the first direction;
a second layer comprising the second fiber yarn extending in the first direction; and
a third layer comprising a third fiber yarn extending in the second direction,
wherein the second one of the bars in the central area of the folding area comprises all of the first layer, the second layer, and the third layer, and
wherein the first one of the bars at the edge of the folding area does not comprise at least one of the first layer, the second layer, and the third layer.

16. The display device of claim 15, wherein a number of types of layers in the second one of the bars in the central area of the folding area from among the first layer, the second layer, and the third layer is greater than a number of types of layers in the first one of the bars at the edge of the folding area from among the first layer, the second layer, and the third layer.

17. The display device of claim 11, wherein the width of each of the slits is smaller than the width of each of the bars.

18. The display device of claim 11, wherein the support member has a first flat portion and a second flat portion in the first non-folding area and the second non-folding area, respectively, and
wherein the height of each of the bars is smaller than a height of the first flat portion and a height of the second flat portion.

19. A display device comprising:
a display panel having a folding area, a first non-folding area on a side of the folding area, and a second non-folding area on another side of the folding area;
a support member on a surface of the display panel and having a plurality of slits in the folding area and a plurality of bars between the slits; and
a base resin on the support member and inside the support member,
wherein a height of a first one of the bars at an edge of the folding area from among the bars is equal to a height of a second one of the bars in a central area of the folding area from among the bars,
wherein a width of a first one of the slits at the edge of the folding area from among the slits is greater than a width of a second one of the slits in the central area of the folding area from among the slits, and
wherein the support member includes a first fiber material extending in a second direction and a second fiber material extending in a first direction different from the second direction.

20. The display device of claim 19, wherein the bars have the same height, and
wherein widths of the slits decrease from the edge of the folding area toward the central area of the folding area.

* * * * *